US009829210B2

(12) United States Patent
Motomura et al.

(10) Patent No.: US 9,829,210 B2
(45) Date of Patent: Nov. 28, 2017

(54) AIR-CONDITIONING APPARATUS AND METHOD FOR CONTROLLING AIR-CONDITIONING APPARATUS BY RANKING CAPACITIES FOR USE-SIDE HEAT EXCHANGERS

(71) Applicant: Mitsubishi Electric Corporation, Tokyo (JP)

(72) Inventors: Yuji Motomura, Tokyo (JP); Naofumi Takenaka, Tokyo (JP); Shinichi Wakamoto, Tokyo (JP); Hirofumi Koge, Tokyo (JP); Osamu Morimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/027,265

(22) PCT Filed: Dec. 19, 2013

(86) PCT No.: PCT/JP2013/084031
§ 371 (c)(1),
(2) Date: Apr. 5, 2016

(87) PCT Pub. No.: WO2015/092896
PCT Pub. Date: Jun. 25, 2015

(65) Prior Publication Data
US 2016/0245539 A1    Aug. 25, 2016

(51) Int. Cl.
*F25B 5/00* (2006.01)
*F24F 11/00* (2006.01)
(Continued)

(52) U.S. Cl.
CPC .............. *F24F 11/008* (2013.01); *F24F 3/06* (2013.01); *F24F 13/30* (2013.01); *F25B 13/00* (2013.01);
(Continued)

(58) Field of Classification Search
CPC ........ F25B 30/02; F25B 2600/25; F25B 7/00; F25B 25/002
See application file for complete search history.

(56) References Cited

U.S. PATENT DOCUMENTS 4,304,098 A * 12/1981 Rydahl .................. A47F 3/0447
62/151
2006/0032623 A1* 2/2006 Tsubone ............. B60H 1/00492
165/202

FOREIGN PATENT DOCUMENTS

EP    2309199 A1    4/2011
EP    2492613 A1    8/2012
(Continued)

OTHER PUBLICATIONS

English Translation of WO2011/030429, Yamashita et al.*
(Continued)

*Primary Examiner* — David Teitelbaum
(74) *Attorney, Agent, or Firm* — Posz Law Group, PLC

(57) ABSTRACT

An air-conditioning apparatus includes a refrigerant circuit formed by connecting, with pipes, a compressor, a first refrigerant flow switching device, a heat-source-side heat exchanger, an expansion device, and a plurality of intermediate heat exchangers. A heat medium circuit is formed by connecting, with pipes, a plurality of pumps configured to pressurize and circulate the heat medium subjected to heat exchange in the plurality of intermediate heat exchangers, a plurality of use-side heat exchangers each configured to exchange heat between the heat medium and air in an air-conditioned space, and a heat-medium flow switching/
(Continued)

control device configured to switch which of the heat medium is to be allowed to flow into and out of each of the use-side heat exchangers; and a controller configured to perform processing for controlling the switching performed by the heat-medium flow switching/control device, in accordance with a capacity of each of the use-side heat exchangers.

8 Claims, 8 Drawing Sheets

(51) Int. Cl.
    *F24F 13/30*     (2006.01)
    *F25B 13/00*     (2006.01)
    *F25B 43/00*     (2006.01)
    *G05B 19/042*     (2006.01)
    *F24F 3/06*     (2006.01)
    *F24F 1/00*     (2011.01)

(52) U.S. Cl.
    CPC .......... *F25B 43/006* (2013.01); *G05B 19/042* (2013.01); *F24F 2001/0074* (2013.01); *F24F 2011/0061* (2013.01); *F24F 2011/0073* (2013.01); *F24F 2011/0082* (2013.01); *F24F 2011/0083* (2013.01); *F25B 2313/006* (2013.01); *F25B 2313/0231* (2013.01); *F25B 2313/0233* (2013.01); *F25B 2313/0292* (2013.01); *F25B 2313/02741* (2013.01); *F25B 2313/0314* (2013.01); *F25B 2600/2513* (2013.01); *G05B 2219/2614* (2013.01)

(56) References Cited

FOREIGN PATENT DOCUMENTS

| | | |
|---|---|---|
| JP | H05-280818 A | 10/1993 |
| JP | 2001-289465 A | 10/2001 |
| JP | 2003-343936 A | 12/2003 |
| JP | 2005-140444 A | 6/2005 |
| JP | WO2011030429 * | 3/2011 ................ F25B 3/06 |
| WO | 2010/049998 A1 | 5/2010 |
| WO | 2011/048679 A1 | 4/2011 |
| WO | 2012/049710 A1 | 4/2012 |

OTHER PUBLICATIONS

International Search Report of the International Searching Authority dated Mar. 25, 2014 for the corresponding international application No. PCT/JP2013/084031 (and English translation).

Extended European Search Report dated Aug. 8, 2017 issued in corresponding EP application No. 13899790.3.

* cited by examiner

AIR-CONDITIONING APPARATUS AND METHOD FOR CONTROLLING AIR-CONDITIONING APPARATUS BY RANKING CAPACITIES FOR USE-SIDE HEAT EXCHANGERS

CROSS REFERENCE TO RELATED APPLICATIONS

This application is a U.S. national stage application of PCT/JP2013/084031 filed on Dec. 19, 2013, the contents of which are incorporated herein by reference.

TECHNICAL FIELD

The present invention relates to an air-conditioning apparatus.

BACKGROUND

Conventionally, in an air-conditioning apparatus, such as a multi-air-conditioning apparatus for a building, refrigerant is circulated, for example, between an outdoor unit installed outside the building and serving as a heat source unit, and an indoor unit installed in a room of the building. The refrigerant transfers or receives heat, so that an air-conditioned space is cooled or heated with heated or cooled air. A refrigerant often used in such an air-conditioning apparatus is, for example, a hydrofluorocarbon-based (HFC-based) refrigerant. Air-conditioning apparatuses using a natural refrigerant, such as carbon dioxide ($CO_2$), are also proposed.

In an air-conditioning apparatus called a chiller, a heat source unit installed outside the building generates cooling energy or heating energy. Then, a heat exchanger installed inside the outdoor unit heats or cools a heat medium, such as water or antifreeze. The heated or cooled heat medium is conveyed, for example, to a fan coil unit or panel heater serving as an indoor unit, which performs cooling or heating (see, e.g., Patent Literature 1).

Also, there is an air-conditioning apparatus called a waste heat recovery chiller in which four water pipes are connected between a heat source unit and an indoor unit, so that cooled water and heated water are supplied at the same time. This allows free selection of either cooling or heating in the indoor unit (see, e.g., Patent Literature 2).

Also, there is an air-conditioning apparatus with a configuration in which a heat exchanger for a primary refrigerant and a secondary refrigerant is installed near each indoor unit, and the secondary refrigerant is conveyed to the indoor unit (see, e.g., Patent Literature 3).

Also, there is an air-conditioning apparatus with a configuration in which an outdoor unit and a branching unit including heat exchangers are connected to each other by two pipes, and a secondary refrigerant is conveyed to an indoor unit (see, e.g., Patent Literature 4).

Also, there is an air-conditioning apparatus, such as a multi-air-conditioning apparatus for a building, which circulates heat-source-side refrigerant from an outdoor unit to a relay unit, and also circulates a heat medium, such as water, from the relay unit to indoor units. The air-conditioning apparatus thus reduces conveying power of the heat medium, such as water, while circulating the heat medium through the indoor units (see, e.g., Patent Literature 5).

PATENT LITERATURE

Patent Literature 1: Japanese Unexamined Patent Application Publication No. 2005-140444 (e.g., page 4, FIG. 1)

Patent Literature 2: Japanese Unexamined Patent Application Publication No. 5-280818 (e.g., pages 4 and 5, FIG. 1)

Patent Literature 3: Japanese Unexamined Patent Application Publication No. 2001-289465 (e.g., pages 5 to 8, FIGS. 1 and 2)

Patent Literature 4: Japanese Unexamined Patent Application Publication No. 2003-343936 (page 5, FIG. 1)

Patent Literature 5: WO10/049998 (e.g., page 3, FIG. 1)

In a conventional air-conditioning apparatus, such as a multi-air-conditioning apparatus for a building, since refrigerant is circulated to indoor units, the refrigerant may leak into a room. In the air-conditioning apparatuses described in Patent Literature 1 and Patent Literature 2, the refrigerant does not pass through the indoor units. However, in the air-conditioning apparatuses described in Patent Literature 1 and Patent Literature 2, the heat medium needs to be heated or cooled in the heat source unit outside the building and then conveyed to the indoor unit side. This increases the length of the circulation path of the heat medium. In this case, when heat for performing the predetermined work of heating or cooling is conveyed using the heat medium, the amount of energy consumed by the conveying power is larger than that in the case of using the refrigerant. The long circulation path means very large conveying power. This indicates that if the circulation of the heat medium can be successfully controlled, energy savings can be achieved in the air-conditioning apparatus.

In the air-conditioning apparatus described in Patent Literature 2, four pipes need to be connected from the outdoor side to the room to allow selection of cooling or heating in each indoor unit, and this causes inconvenience in installation. In the air-conditioning apparatus described in Patent Literature 3, each indoor unit needs to include secondary-medium circulating means, such as a pump. This results in high system cost, high noise level, and thus low practicality. Additionally, since the heat exchangers are located near the indoor units, it is difficult to eliminate the risk of leakage of the refrigerant in a location near a room.

In the air-conditioning apparatus described in Patent Literature 4, the primary refrigerant that has been subjected to heat exchange flows through the same passage as the primary refrigerant that has not yet been subjected to heat exchange. As a result, when a plurality of indoor units are connected, each indoor unit cannot achieve the maximum performance and energy is wasted. Also, the connection between the branching unit and extension pipes is made with a total of four pipes, two for cooling and two for heating. This results in a configuration similar to a system where the outdoor unit and the branching unit are connected by four pipes, and causes inconvenience in system installation.

The air-conditioning apparatus described in Patent Literature 5 performs air-conditioning with the relay unit in the building. The relay unit exchanges heat between the heat-source-side refrigerant and the heat medium, and sends the heated or cooled heat medium to the indoor units. With this configuration, the air-conditioning apparatus described in Patent Literature 5 solves the problems with conveying power and workability. The air-conditioning apparatus described in Patent Literature 5 includes two or more intermediate heat exchangers to simultaneously perform heating and cooling of the heat medium, thereby providing a cooling and heating mixed operation that allows a plurality of indoor units to independently select either cooling or heating.

For example, when all the plurality of indoor units perform heating or cooling, the two or more intermediate heat exchangers can heat or cool heat medium. In this case, if the heat medium subjected to heat exchange in the two or more intermediate heat exchangers can be appropriately distributed to the plurality of indoor units, an efficient operation can be achieved.

SUMMARY

The present invention has been made to solve the problems described above. An object of the present invention is to provide an air-conditioning apparatus capable of efficiently supplying an amount of heat for covering air-conditioning load to a plurality of indoor units.

An air-conditioning apparatus according to the present invention includes a refrigerant circuit formed by connecting, with pipes, a compressor configured to compress a heat-source-side refrigerant, a refrigerant flow switching device configured to switch a circulation path of the heat-source-side refrigerant, a heat-source-side heat exchanger configured to cause the heat-source-side refrigerant to exchange heat, an expansion device configured to regulate a pressure of the heat-source-side refrigerant, and a plurality of intermediate heat exchangers each configured to exchange heat between the heat-source-side refrigerant and a heat medium different from the heat-source-side refrigerant; a heat medium circuit formed by connecting, with pipes, a plurality of pumps configured to pressurize and circulate the heat medium subjected to heat exchange in the plurality of intermediate heat exchangers, a plurality of use-side heat exchangers each configured to exchange heat between the heat medium and air in an air-conditioned space, and a flow switching device configured to switch which of the heat medium subjected to heat exchange in the plurality of intermediate heat exchangers is to be allowed to flow into and out of each of the use-side heat exchangers; and a controller configured to perform processing for controlling the switching performed by the flow switching device, in accordance with a capacity of each of the use-side heat exchangers.

In the air-conditioning apparatus of the present invention, in accordance with the capacity of each of the use-side heat exchangers, the controller switches the flow switching device to perform distribution processing that determines which of the heat medium subjected to heat exchange in the plurality of intermediate heat exchangers is to be allowed to flow into and out of which of the use-side heat exchangers. Thus, efficient operation and energy savings of the entire apparatus can be achieved.

DETAILED DESCRIPTION

Figure 1:
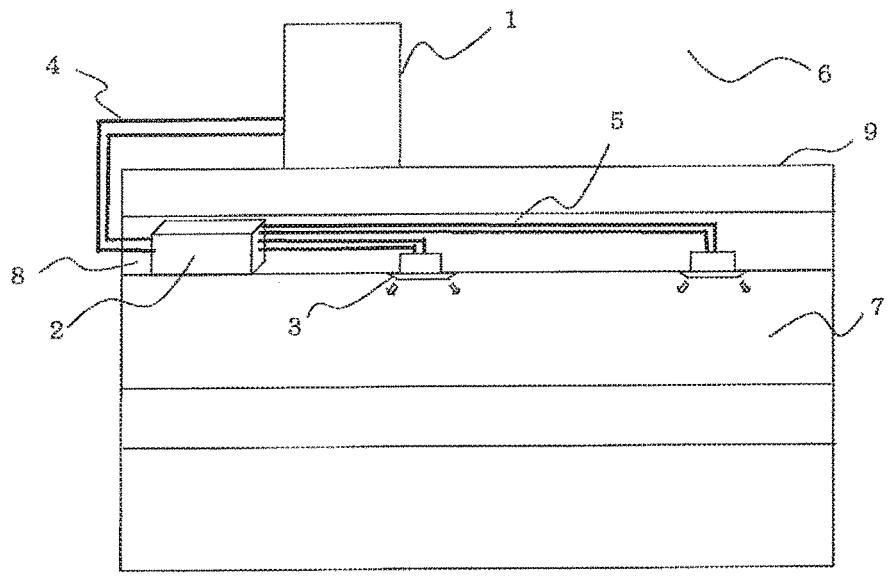
FIG. 1 is a schematic diagram illustrating an example of installation of an air-conditioning apparatus according to Embodiment 1 of the present invention.

Air-conditioning apparatuses according to Embodiments 1 and 2 of the invention will now be described with reference to the drawings. In the following drawings including FIG. 1, the components denoted by the same reference numerals are the same or equivalent components and are common throughout the description of Embodiments 1 and 2. Forms of the components described throughout the specification are merely examples, and are not limited to those described in the specification. In particular, combinations of components are not limited to those described in Embodiments 1 and 2, and a component described in one of Embodiments 1 and 2 can be applied to the other of Embodiments 1 and 2. For a plurality of devices of the same type that are distinguished by suffixes, the suffixes may be omitted when there is no particular need for distinction or identification. In the drawings, the dimensional relationships among the components may differ from the actual ones. The levels of temperature and pressure are not specifically defined in relation to absolute values, but are defined, for example, in relation to conditions or operations in the system or apparatus.

Embodiment 1

FIG. 1 is a schematic diagram illustrating an example of installation of an air-conditioning apparatus according to Embodiment 1 of the present invention. The example of installation of the air-conditioning apparatus according to Embodiment 1 will be described on the basis of FIG. 1. FIG. 1 schematically illustrates the entire air-conditioning apparatus that connects a plurality of indoor units 3. Through the use of circuits (refrigerant circuit A, heat medium circuit B) that circulate a heat-source-side refrigerant and a heat medium, respectively, the air-conditioning apparatus of Embodiment 1 can achieve an operation that allows free selection of either cooling or heating in each of the indoor units 3.

As illustrated in FIG. 1, the air-conditioning apparatus according to Embodiment 1 includes an outdoor unit (heat source unit) 1, the plurality of indoor units 3, and a relay unit 2 interposed between the outdoor unit 1 and the indoor units 3. The relay unit 2 is configured mainly to exchange heat between the heat-source-side refrigerant and the heat medium. The outdoor unit 1 and the relay unit 2 are connected to each other by refrigerant pipes 4 through each of which the heat-source-side refrigerant passes. The relay unit 2 and the indoor units 3 are connected to each other by pipes (heat medium pipes) 5 through each of which the heat medium passes. Cooling energy or heating energy generated by the outdoor unit 1 can be distributed through the relay unit 2 to the indoor units 3.

The outdoor unit 1 is typically disposed in an outdoor space 6 that is a space outside a building 9 (e.g., rooftop), and configured to supply cooling energy or heating energy to each of the indoor units 3 through the relay unit 2. The indoor units 3 are disposed at positions where they can supply cooling air (cooled air) or heating air (heated air) to an indoor space 7 that is a space inside the building 9 (e.g., room). The indoor units 3 thus supply cooling air or heating air to the indoor space 7 that is an air-conditioned space. As a body separate from the outdoor unit 1 and the indoor units 3, the relay unit 2 is configured to be able to be installed in a location different from the outdoor space 6 and the indoor space 7. The relay unit 2 is connected to the outdoor unit 1 by the refrigerant pipes 4 and connected to the indoor units 3 by the pipes 5, so that cooling energy or heating energy supplied from the outdoor unit 1 is transferred to the indoor units 3.

An operation of the air-conditioning apparatus according to Embodiment 1 of the present invention will be briefly described. The heat-source-side refrigerant is conveyed from the outdoor unit 1 to the relay unit 2 through the refrigerant pipes 4. The conveyed heat-source-side refrigerant exchanges heat with the heat medium in an intermediate heat exchanger (described below) included in the relay unit 2 to heat or cool the heat medium. Either the heated heat medium or the cooled heat medium is selected and conveyed to each of the indoor units 3, and is used to heat or cool the indoor space 7.

The heat-source-side refrigerant may be, for example, a single refrigerant, such as R-22, R-134a, or R32, a near-azeotropic refrigerant mixture, such as R-410A or R-404A, a non-azeotropic refrigerant mixture, such as R-407C, a refrigerant that includes a double bond in the chemical formula and has a relatively small global warming potential, such as $CF_3CF=CH_2$, a mixture of any of these refrigerants, or a natural refrigerant, such as $CO_2$ or propane.

On the other hand, the heat medium may be, for example, water, antifreeze (brine), a mixed solution of water and antifreeze, or a mixed solution of water and a highly anticorrosive additive. Therefore, even if leaking through any of the indoor units 3 into the indoor space 7, the heat medium is harmless to human bodies, and this contributes to improved safety.

As illustrated in FIG. 1, in the air-conditioning apparatus according to Embodiment 1, the outdoor unit 1 and the relay unit 2 are connected to each other using two refrigerant pipes 4, and the relay unit 2 and each of the indoor units 3 are connected to each other using two pipes 5. Thus, in the air-conditioning apparatus according to Embodiment 1, the units (outdoor unit 1, indoor units 3, and relay unit 2) can be connected to each other using two pipes (refrigerant pipes 4 or pipes 5), so that easy construction is possible.

FIG. 1 illustrates an example where the relay unit 2 is installed in a space above a ceiling (hereinafter simply referred to as a space 8) that is a space inside the building 9 but not the indoor space 7. The relay unit 2 may be installed, for example, in a common space where there is an elevator. Although FIG. 1 illustrates the indoor units 3 of a ceiling cassette type as an example, the type of the indoor units 3 is not limited to this. For example, the indoor units 3 may each be a ceiling-concealed or ceiling-suspended unit capable of blowing heating or cooling air into the indoor space 7 either directly or through a duct.

The indoor units 3 do not necessarily need to be capable of blowing heating or cooling air. For example, like a panel heater or floor heating device, the indoor units 3 may each be configured as a device that is intended to give a heating or cooling effect to the indoor space 7 through the supply of a heated or cooled heat medium from the relay unit 2.

Although FIG. 1 illustrates the outdoor unit 1 installed in the outdoor space 6 as an example, the location of the outdoor unit 1 is not limited to this. For example, the outdoor unit 1 may be installed in a confined space, such as a machine room with air vents. If heat can be discharged through an exhaust duct to the outside of the building 9, the outdoor unit 1 may be installed inside the building 9. Also, if the outdoor unit 1 of a water-cooled type is used, the outdoor unit 1 may be installed inside the building 9. Installing the outdoor unit 1 in such locations does not cause a particular problem.

The relay unit 2 may be installed near the outdoor unit 1. Note, however, that if the distance from the relay unit 2 to the indoor units 3 is too long, the conveying power of the heat medium increases significantly and the energy-saving effect is reduced accordingly. Also, the number of connected units, including the outdoor unit 1, indoor units 3, and relay unit 2, is not limited to that illustrated in FIG. 1. Any number of units appropriate for the building 9, where the air-conditioning apparatus of Embodiment 1 is installed, can be installed.

For example, when a plurality of relay units 2 are connected to one outdoor unit 1, the plurality of relay units 2 may be separately placed in different locations, such as a common space and a space above the ceiling in the building 9. By separately placing the plurality of relay units 2, the air-conditioning load can be covered by an intermediate heat exchanger in each of the relay units 2. The indoor units 3 can each be installed at a distance or height within an allowable conveying range of a heat-medium conveying device (e.g., pump) included in each relay unit 2. The indoor units 3 can thus be distributed throughout the building 9.

Figure 2:
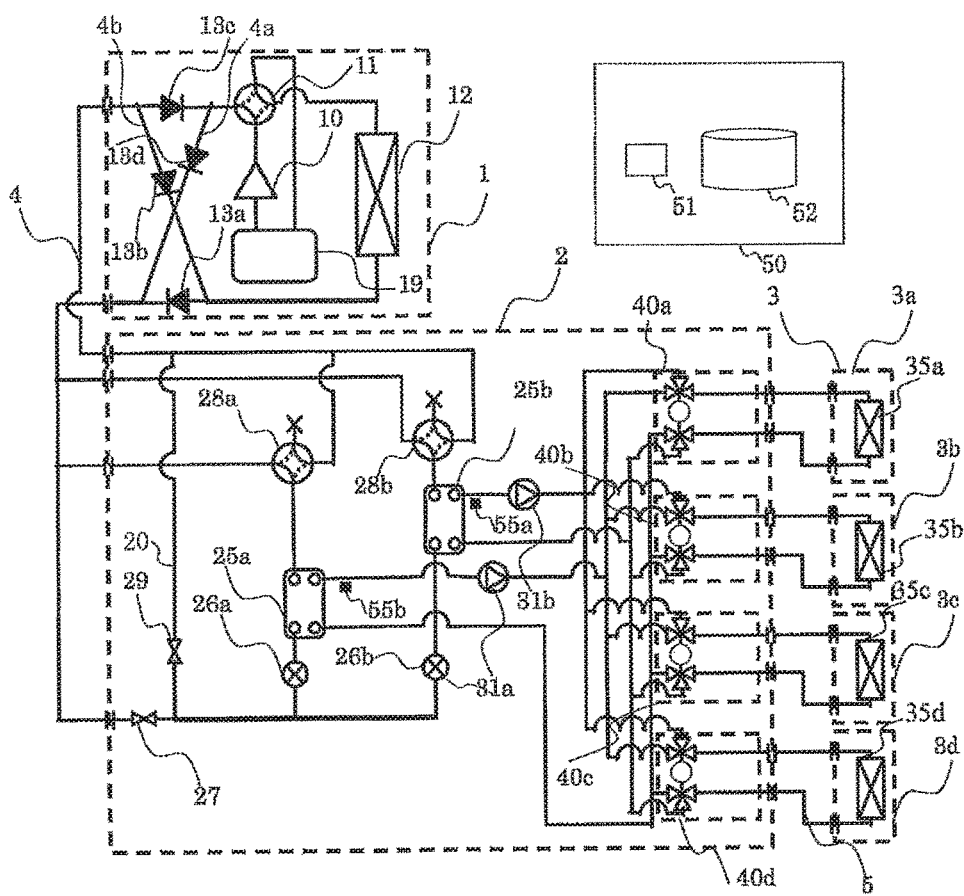
FIG. 2 illustrates a configuration of an air-conditioning apparatus 100 according to Embodiment 1 of the present invention.

FIG. 2 illustrates a configuration of an air-conditioning apparatus 100 according to Embodiment 1 of the present invention. The action of each actuator forming the air-conditioning apparatus 100 will be described in detail on the basis of FIG. 2. As illustrated in FIG. 2, the outdoor unit 1 and the relay unit 2 are connected by the refrigerant pipes 4 through an intermediate heat exchanger (refrigerant-water heat exchanger) 25a, an intermediate heat exchanger (refrigerant-water heat exchanger) 25b, and the heat-medium flow switching/control devices 40 included in the relay unit 2. The relay unit 2 and the indoor units 3 are connected by the pipes 5 through the intermediate heat exchanger 25a and the intermediate heat exchanger 25b.

[Outdoor Unit 1]

The outdoor unit 1 includes a compressor 10, a first refrigerant flow switching device 11 such as a four-way valve, a heat-source-side heat exchanger 12, and an accumulator 19 that are connected by the refrigerant pipes 4. The outdoor unit 1 also includes a refrigerant pipe 4a, a refrigerant pipe 4b, a check valve 13a, a check valve 13b, a check valve 13c, and a check valve 13d. With the refrigerant pipe 4a, the refrigerant pipe 4b, the check valve 13a, the check valve 13b, the check valve 13c, and the check valve 13d, the direction of flow of the heat-source-side refrigerant into the relay unit 2 can be made constant regardless of the operation requested by any indoor unit 3.

The compressor 10 suctions the heat-source-side refrigerant, compresses the suctioned heat-source-side refrigerant to turn it into a high-temperature and high-pressure state, and circulates it in the refrigerant circuit A. For example, the compressor 10 may be formed by a capacity-controllable inverter compressor. The first refrigerant flow switching device 11 switches the flow of the heat-source-side refrigerant between the heating operation (heating only operation mode and heating main operation mode) and the cooling operation (cooling only operation mode and cooling main operation mode).

The heat-source-side heat exchanger 12 functions as an evaporator during heating operation, and functions as a condenser (or radiator) during cooling operation. The heat-source-side heat exchanger 12 exchanges heat between an air fluid supplied from an air-sending device, such as a fan (not shown), and the heat-source-side refrigerant, and evaporates and gasifies, or condenses and liquefies, the heat-source-side refrigerant. The accumulator 19 is disposed on the suction side of the compressor 10. The accumulator 19 accumulates excess refrigerant produced by a difference between the heating and the cooling operations, and excess refrigerant produced by transient changes in operation.

The check valve 13c is provided in the refrigerant pipe 4 between the relay unit 2 and the first refrigerant flow switching device 11, and allows the flow of the heat-source-side refrigerant only in a predetermined direction (from the relay unit 2 to the outdoor unit 1). The check valve 13a is provided in the refrigerant pipe 4 between the heat-source-side heat exchanger 12 and the relay unit 2, and allows the flow of the heat-source-side refrigerant only in a predetermined direction (from the outdoor unit 1 to the relay unit 2). The check valve 13d is provided in the refrigerant pipe 4a. During heating operation, the check valve 13d allows the heat-source-side refrigerant discharged from the compressor 10 to flow to the relay unit 2. The check valve 13b is provided in the refrigerant pipe 4b. During heating operation, the check valve 13b allows the heat-source-side refrigerant returned from the relay unit 2 to flow to the suction side of the compressor 10.

In the outdoor unit 1, the refrigerant pipe 4a connects the refrigerant pipe 4 between the first refrigerant flow switching device 11 and the check valve 13c to the refrigerant pipe 4 between the check valve 13a and the relay unit 2. Also in the outdoor unit 1, the refrigerant pipe 4b connects the refrigerant pipe 4 between the check valve 13c and the relay unit 2 to the refrigerant pipe 4 between the heat-source-side heat exchanger 12 and the check valve 13a. Although FIG. 2 illustrates an example where the refrigerant pipe 4a, the refrigerant pipe 4b, the check valve 13a, the check valve 13b, the check valve 13c, and the check valve 13d are provided, these components are optional.

[Indoor Unit 3]

Each of the indoor units 3 includes a use-side heat exchanger 35. The use-side heat exchanger 35 is connected by pipes 5 to a heat-medium flow control device and a second heat-medium flow switching device in the relay unit 2. The use-side heat exchanger 35 exchanges heat between air supplied from an air-sending device, such as a fan (not shown), and the heat medium, and generates heating air or cooling air to be supplied to the indoor space 7.

FIG. 2 illustrates four indoor units 3 connected to the relay unit 2 as an example. The indoor units 3 are shown in the following order from the upper side of the drawing: indoor unit 3a, indoor unit 3b, indoor unit 3c, and indoor unit 3d. In correspondence with the indoor units 3a to 3d, the use-side heat exchangers 35 are also shown in the following order from the upper side of the drawing: use-side heat exchanger 35a, use-side heat exchanger 35b, use-side heat exchanger 35c, and use-side heat exchanger 35d. As in the case of FIG. 1, the number of the indoor units 3 connected is not limited to four.

[Relay Unit 2]

The relay unit 2 includes two or more intermediate heat exchangers 25, two expansion devices 26, two opening and closing devices (opening and closing device 27, opening and closing device 29), two second refrigerant flow switching devices 28, two pumps 31 serving as heat-medium conveying devices (hereinafter referred to as pumps), and four heat-medium flow switching/control devices 40.

The two intermediate heat exchangers 25 (intermediate heat exchanger 25a, intermediate heat exchanger 25b) each function as a condenser (radiator) for supplying heating energy to indoor units 3 in the heating operation and function as an evaporator for supplying cooling energy to indoor units 3 in the cooling operation, exchange heat between the heat-source-side refrigerant and the heat medium, and transfer cooling or heating energy generated by the outdoor unit 1 and stored in the heat-source-side refrigerant to the heat medium. The intermediate heat exchanger 25a is disposed between an expansion device 26a and a second refrigerant flow switching device 28a in the refrigerant circuit A, and serves to cool the heat medium in a cooling and heating mixed operation mode. The intermediate heat exchanger 25b is disposed between an expansion device 26b and a second refrigerant flow switching device 28b in the refrigerant circuit A, and serves to heat the heat medium in the cooling and heating mixed operation mode.

The two expansion devices 26 (expansion device 26a, expansion device 26b) each have the function of a reducing valve or an expansion valve, and reduce the pressure of the heat-source-side refrigerant to expand the heat-source-side refrigerant. The expansion device 26a is located upstream of the intermediate heat exchanger 25a in the flow of the heat-source-side refrigerant during cooling operation. The expansion device 26b is located upstream of the intermediate heat exchanger 25b in the flow of the heat-source-side refrigerant during cooling operation. The two expansion devices 26 may each be formed by a device having a variably controllable opening degree, such as an electronic expansion valve.

The two opening and closing devices (opening and closing device 27, opening and closing device 29) are each formed, for example, by a solenoid valve capable of opening and closing by electricity, thereby opening and closing the refrigerant pipe 4. That is, the two opening and closing devices are each controlled to open and close in accordance with the operation mode, thereby switching the passage of the heat-source-side refrigerant. The opening and closing device 27 is disposed in the refrigerant pipe 4 on the inlet side of the heat-source-side refrigerant (i.e., in the refrigerant pipe 4 located at the bottom of the drawing among the refrigerant pipes 4 connecting the outdoor unit 1 to the relay unit 2). The opening and closing device 29 is disposed in a pipe (bypass pipe 20) connecting the refrigerant pipe 4 on the inlet side of the heat-source-side refrigerant to the refrigerant pipe 4 on the outlet side of the heat-source-side refrigerant. The opening and closing device 27 and the opening and closing device 29 may each be of any type, as long as it is capable of switching the refrigerant passage. For example, the opening and closing device 27 and the opening and closing device 29 may each be an electronic expansion valve having a variably controllable opening degree.

The two second refrigerant flow switching devices 28 (second refrigerant flow switching device 28a, second refrigerant flow switching device 28b) are each formed, for example, by a four-way valve, and configured to switch the flow of the heat-source-side refrigerant such that the corresponding intermediate heat exchanger 25 acts as a condenser or evaporator in accordance with the operation mode. The second refrigerant flow switching device 28a is located downstream of the intermediate heat exchanger 25a in the flow of the heat-source-side refrigerant during cooling operation. The second refrigerant flow switching device 28b is located downstream of the intermediate heat exchanger 25b in the flow of the heat-source-side refrigerant in the cooling only operation mode.

The two pumps 31 (pump 31a, pump 31b) are each configured to circulate the heat medium passing through the pipe 5 in the heat medium circuit B. The pump 31a is disposed in the pipe 5 between the intermediate heat exchanger 25a and the heat-medium flow switching/control devices 40. The pump 31b is disposed in the pipe 5 between the intermediate heat exchanger 25b and the heat-medium flow switching/control devices 40. The two pumps 31 may each be formed, for example, by a capacity-controllable pump, and configured to be able to control the flow rate in accordance with the magnitude of the air-conditioning load on the indoor unit 3.

The four heat-medium flow switching/control devices 40 (heat-medium flow switching/control devices 40a to 40d) are each formed, for example, by a drive unit and a valve body, and configured not only to switch the passage of the heat medium between the intermediate heat exchanger 25a and the intermediate heat exchanger 25b but also to control the flow rate of the heat medium toward each branch. The number of the heat-medium flow switching/control devices 40 (which is four here) corresponds to the number of the indoor units 3 installed, so that the heat-medium flow switching/control devices 40 can be coupled to the respective indoor units 3. The heat-medium flow switching/control devices 40 are each internally connected at one end thereof to the intermediate heat exchanger 25a and connected at the other end thereof to the intermediate heat exchanger 25b, and also connected to the corresponding use-side heat exchanger 35. The heat-medium flow switching/control device 40a, the heat-medium flow switching/control device 40b, the heat-medium flow switching/control device 40c, and the heat-medium flow switching/control device 40d are shown in this order from the upper side of the drawing, in correspondence with the indoor units 3. The switching of the heat medium passage includes not only complete switching from one to the other, but also includes partial switching from one to the other.

The four heat-medium flow switching/control devices 40 (heat-medium flow switching/control devices 40a to 40d) each are also capable of controlling the flow rate, and are configured to regulate the opening area to control the flow rate of the heat medium flowing through the pipes 5. The heat-medium flow switching/control devices 40 are each connected the corresponding use-side heat exchanger 35 at one end, and connected to the intermediate heat exchangers 25 at the other end. That is, the heat-medium flow switching/ control devices 40 are each capable of controlling the amount of heat medium flowing into the corresponding indoor unit 3, in accordance with the temperatures of the heat medium flowing into and out of the indoor unit 3, thereby providing the indoor unit 3 with an optimal amount of heat medium (amount of supplied heat) appropriate for the air-conditioning load.

When the indoor unit 3 is in the off or thermo-OFF state (e.g., a fan in the indoor unit 3 is not in operation) and no air-conditioning load is required, or when the passage of the heat medium needs to be blocked for maintenance, the supply of the heat medium to the indoor unit 3 can be stopped by fully closing the corresponding heat-medium flow switching/control device 40.

The relay unit 2 also includes temperature sensors 55 (temperature sensor 55a, temperature sensor 55b) each configured to detect the temperature of the heat medium on the outlet side of the corresponding intermediate heat exchanger 25. Information detected by the temperature sensors 55 (temperature information) is sent to a controller 50 that controls the overall operation of the air-conditioning apparatus 100, and used for controlling the driving frequency of the compressor 10, the rotation speed of the air-sending device (not shown), the switching of the first refrigerant flow switching device 11, the driving frequency of the pumps 31, the switching of the second refrigerant flow switching devices 28, the switching of the passage of the heat medium, and the regulation of the flow rate of the heat medium in the indoor units 3. The controller 50 may be included in the relay unit 2, the outdoor unit 1 or each indoor unit 3, or in each unit in such a way that it can communicate.

The controller 50 is formed, for example, by a microcomputer including a central processing unit (CPU). In accordance with detected information from various detecting means and instructions from a remote control, the controller 50 controls each of actuators (pumps 31, expansion devices 26), such as the driving frequency of the compressor 10, the rotation speed (including ON/OFF) of the air-sending device, the switching of the first refrigerant flow switching device 11, the driving of the pumps 31, the opening degree of the expansion devices 26, the opening and closing of the opening and closing devices, the switching of the second refrigerant flow switching devices 28, and the switching and driving of the heat-medium flow switching/ control devices 40. The controller 50 of Embodiment 1 includes a timer 51 for time measurement and a storage device 52 that stores data necessary for processing.

The pipes 5 through each of which the heat medium passes include those connected to the intermediate heat exchanger 25a and those connected to the intermediate heat exchanger 25b. The pipes 5 are each branched (into four here) in accordance with the number of the indoor units 3 connected to the relay unit 2. The pipes 5 are connected together by the heat-medium flow switching/control devices 40. By controlling each of the heat-medium flow switching/ control devices 40, a determination is made as to whether to allow the heat medium from the intermediate heat exchanger 25a to flow into the use-side heat exchanger 35, or allow the heat medium from the intermediate heat exchanger 25b to flow into the use-side heat exchanger 35.

In the air-conditioning apparatus 100, the compressor 10, the first refrigerant flow switching device 11, the heat-source-side heat exchanger 12, the opening and closing device 27, the opening and closing device 29, the second refrigerant flow switching devices 28, the refrigerant passages of the intermediate heat exchangers 25, the expansion devices 26, and the accumulator 19 are connected by the refrigerant pipes 4 to form the refrigerant circuit A. At the same time, the heat medium passages of the intermediate heat exchangers 25, the pumps 31, the heat-medium flow switching/control devices 40, and the use-side heat exchangers 35 are connected by the pipes 5 to form the heat medium circuit B. That is, a plurality of use-side heat exchangers 35 are connected in parallel to each of the intermediate heat exchangers 25 to form the heat medium circuit B as multiple systems.

Accordingly, in the air-conditioning apparatus 100, the outdoor unit 1 and the relay unit 2 are connected through the intermediate heat exchanger 25a and the intermediate heat exchanger 25b included in the relay unit 2, and the relay unit 2 and the indoor units 3 are connected through the intermediate heat exchanger 25a and the intermediate heat exchanger 25b. That is, in the air-conditioning apparatus 100, the heat-source-side refrigerant circulating in the refrigerant circuit A and the heat medium circulating in the heat medium circuit B exchange heat in the intermediate heat exchanger 25a and the intermediate heat exchanger 25b. With this configuration, the air-conditioning apparatus 100 can achieve optimal cooling or heating corresponding to the air-conditioning load.

[Heat-Medium Flow Switching/Control Device 40]

Figure 3:
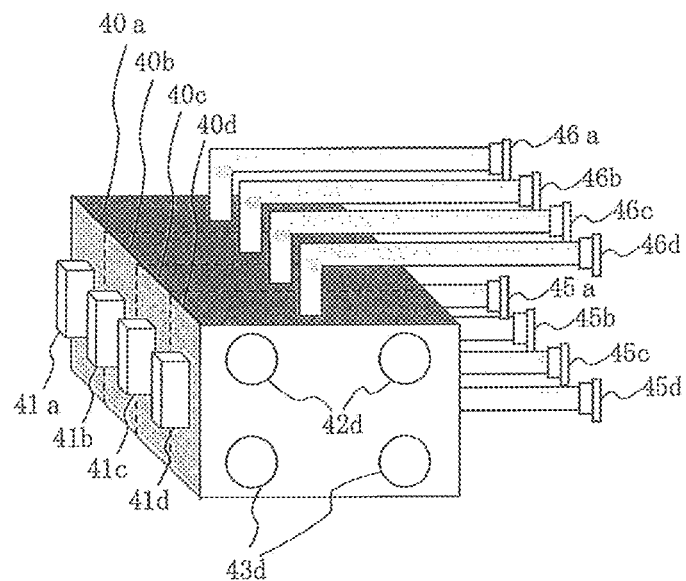
FIG. 3 illustrates a configuration of heat-medium flow switching/control devices 40 according to Embodiment 1 of the present invention.

FIG. 3 illustrates a configuration of the heat-medium flow switching/control devices 40 according to Embodiment 1 of the present invention. As described above, the heat-medium flow switching/control devices 40 of Embodiment 1 are connected to the respective indoor units 3 (pipes 5). Therefore, the relay unit 2 of Embodiment 1 includes the four heat-medium flow switching/control devices 40a to 40d corresponding to the indoor units 3a to 3d. As described below, main cooling-heat-medium conveying pipes 42 and main heating-heat-medium conveying pipes 43 of each of the heat-medium flow switching/control devices 40 are connected to form pipes through each of which the heat medium passes. As illustrated in FIG. 3, the main cooling-heat-medium conveying pipes 42 and the main heating-heat-medium conveying pipes 43 are connected to integrally form the plurality of heat-medium flow switching/control devices 40. Although the four heat-medium flow switching/control devices 40 are connected in correspondence with the indoor units 3 in Embodiment 1, the number of the heat-medium flow switching/control devices 40 is not limited to this.

Figure 4:
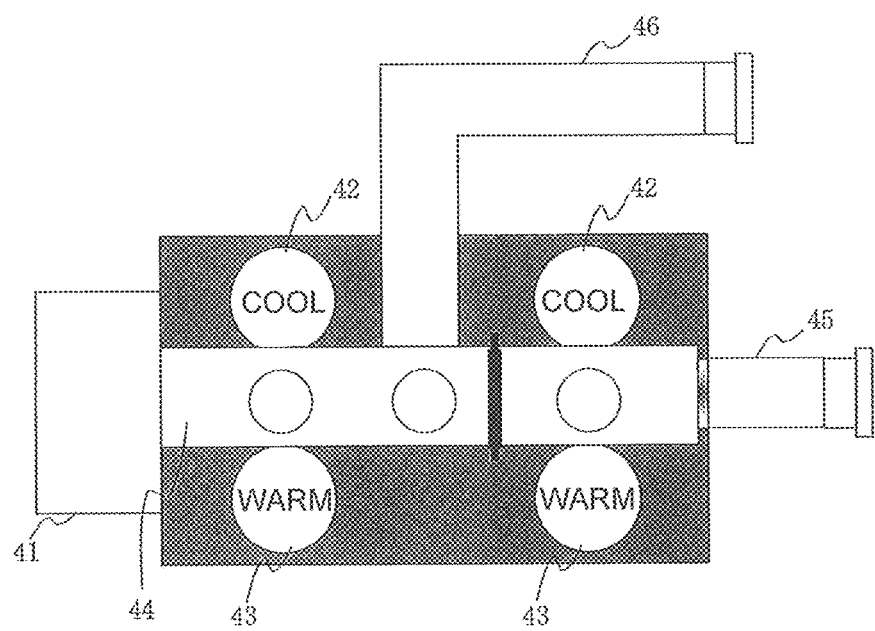
FIG. 4 illustrates an internal configuration of one of the heat-medium flow switching/control devices 40 according to Embodiment 1 of the present invention.

FIG. 4 illustrates an internal configuration of one of the heat-medium flow switching/control devices 40 according to Embodiment 1 of the present invention. As illustrated in FIG. 4, the heat-medium flow switching/control device 40 of Embodiment 1 includes one drive unit 41, two main cooling-heat-medium conveying pipes 42, two main heating-heat-medium conveying pipes 43, one heat-medium flow switching valve 44, one connected-indoor-unit conveyance pipe 45, and one connected-indoor-unit return pipe 46.

The drive unit 41 is driven in accordance with an instruction from the controller 50 to rotate the heat-medium flow switching valve 44, thereby switching the passage. The drive unit 41 may be, for example, a stepping motor capable of regulating the rotation angle to regulate the opening area of the heat-medium flow switching valve 44, thereby controlling the flow rate of the passing heat medium. When the heat-medium flow switching/control device 40 does not need to control the flow rate, the drive unit 41 may be a device simply capable of switching (e.g., between ON and OFF of the power). The switching of the heat medium and the control of the flow rate of the heat medium can thus be done by the single drive unit 41 in the heat-medium flow switching/control device 40, whereby the heat-medium flow switching/control device 40 can achieve size reduction and energy savings. Since only one drive unit is required here, ease of maintenance can also be achieved.

The main cooling-heat-medium conveying pipes 42 are each a pipe through which mainly a cooled heat medium passes. The main heating-heat-medium conveying pipes 43 are each a pipe through which mainly a heated heat medium passes. As illustrated in FIG. 3, the main cooling-heat-medium conveying pipes 42 and the main heating-heat-medium conveying pipes 43 in the plurality of heat-medium flow switching/control devices 40 are connected to allow the heat medium to pass therethrough. The main cooling-heat-medium conveying pipes 42 and the main heating-heat-medium conveying pipes 43 both include two main pipes, a supply pipe and a return pipe. If both the intermediate heat exchanger 25a and the intermediate heat exchanger 25b heat the heat medium, the heated heat medium also flows through the main cooling-heat-medium conveying pipes 42. If both the intermediate heat exchanger 25a and the intermediate heat exchanger 25b cool the heat medium, the cooled heat medium also flows through the main heating-heat-medium conveying pipes 43. The connected-indoor-unit conveyance pipe 45 is a pipe through which the heat medium to be supplied to the indoor unit 3 passes. The connected-indoor-unit return pipe 46 is a pipe through which the heat medium returned from the indoor unit 3 passes.

The heat-medium flow switching valve 44 has two through holes, each serving as a passage of the heated or cooled heat medium. The heat-medium flow switching valve 44 is rotated by the driving of the drive unit 41, thereby causing the main cooling-heat-medium conveying pipes 42 or the main heating-heat-medium conveying pipes 43 to communicate with the connected-indoor-unit conveyance pipe 45 and the connected-indoor-unit return pipe 46. In Embodiment 1, the heat-medium flow switching valve 44 has a partition wall between the two through holes to prevent exchange of heat between the heat medium to be supplied to the indoor unit 3 and the heat medium returned from the indoor unit 3.

In each heat-medium flow switching/control device 40, the drive unit 41 rotates the heat-medium flow switching valve 44 in accordance with an instruction from the controller 50. By the rotation, the main cooling-heat-medium conveying pipes 42 or the main heating-heat-medium conveying pipes 43 are selected. The selected main heat-medium conveying pipes are caused to communicate with the connected-indoor-unit conveyance pipe 45 and the connected-indoor-unit return pipe 46. The heat medium passing through the selected main heat-medium conveying pipes flows into and out of the indoor unit 3.

The operation of the heat-medium flow switching/control devices 40 will now be described for each state of the heat-medium flow switching/control devices 40.

[Operation of Heat-Medium Flow Switching/Control Device 40 During Cooling]

Figure 5:
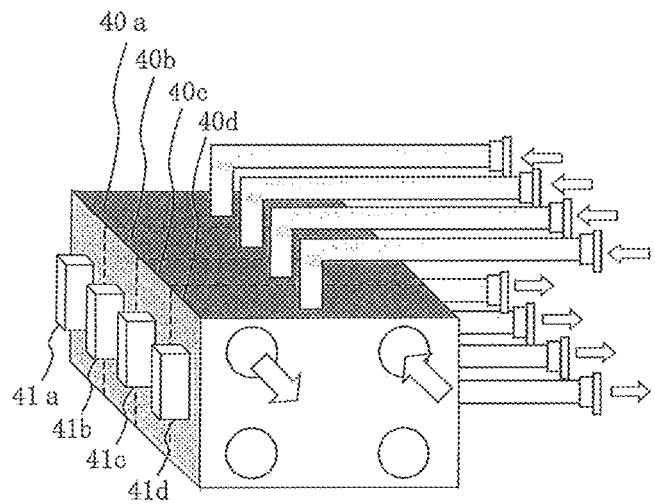
FIG. 5 illustrates the flow of a heat medium into and out of each of the heat-medium flow switching/control devices 40 when a cooled heat medium is allowed to pass therethrough.

FIG. 5 illustrates the flow of a heat medium into and out of each of the heat-medium flow switching/control devices 40 when a cooled heat medium is allowed to pass therethrough. In FIG. 5, solid arrows each indicate the direction of flow of a cooled heat medium. The heat medium cooled by exchanging heat with the heat-source-side refrigerant in the intermediate heat exchanger 25 and pressurized by the pump 31 flows into the heat-medium flow switching/control device 40. The cooled heat medium passes through the main cooling-heat-medium conveying pipes 42 in the heat-medium flow switching/control device 40.

Figure 6:
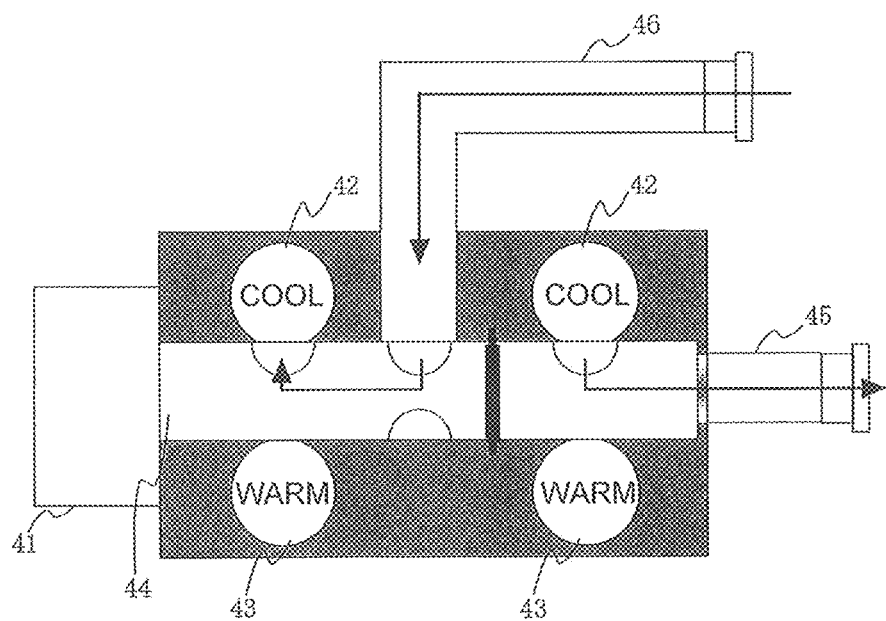
FIG. 6 illustrates a passage and flow of a heat medium inside one of the heat-medium flow switching/control devices 40 when a cooled heat medium is allowed to pass therethrough.

FIG. 6 illustrates a passage and flow of a heat medium inside one of the heat-medium flow switching/control devices 40 when a cooled heat medium is allowed to pass therethrough. For example, the drive unit 41 rotates the heat-medium flow switching valve 44, so that the through holes of the heat-medium flow switching valve 44 allow the connected-indoor-unit conveyance pipe 45 and the connected-indoor-unit return pipe 46 to communicate with the main cooling-heat-medium conveying pipes 42. The heat medium flowing through one of the main cooling-heat-medium conveying pipes 42 passes through the corresponding through hole of the heat-medium flow switching valve 44, flows through the connected-indoor-unit conveyance pipe 45, and is conveyed to the corresponding indoor unit 3.

After exchanging heat with the indoor space 7 at the use-side heat exchanger 35 in the indoor unit 3, the heat medium passes through the connected-indoor-unit return pipe 46 and flows into the heat-medium flow switching/control device 40 again. Then, the heat medium passes through the other through hole of the heat-medium flow switching valve 44, flows through the corresponding main cooling-heat-medium conveying pipe 42, and flows into the intermediate heat exchanger 25.

The heat medium returned from the indoor unit 3 comes close to the heat medium that has passed through the intermediate heat exchanger 25 as in FIG. 2, flowed through one of the main cooling-heat-medium conveying pipes 42, and flowed into the heat-medium flow switching valve 44 toward the indoor unit 3. Although the heat-medium flow switching valve 44 has the partition wall therein to prevent exchange of heat capacity between the heat media, any structure can be used as long as it can prevent exchange of heat capacity between the heat media.

For example, if it is possible to regulate the opening area of the heat-medium flow switching valve 44, the drive unit 41 regulates the opening area of the heat-medium flow switching valve 44, in accordance with an instruction from the controller 50, such that the difference between the temperature of the heat medium at the temperature sensor 55 of the relay unit 2 and the temperature of the heat medium at the use-side heat exchanger 35 is kept at a target value. When the drive unit 41 regulates the opening area, the flow rate of the heat medium flowing in the indoor unit 3 can be controlled to cover the air-conditioning load to be supplied to the indoor space 7. When there is no need to control the flow rate of the heat medium flowing in the indoor unit 3, it is not necessary to regulate the opening area.

[Operation of Heat-Medium Flow Switching/Control Device 40 During Heating]

Figure 7:
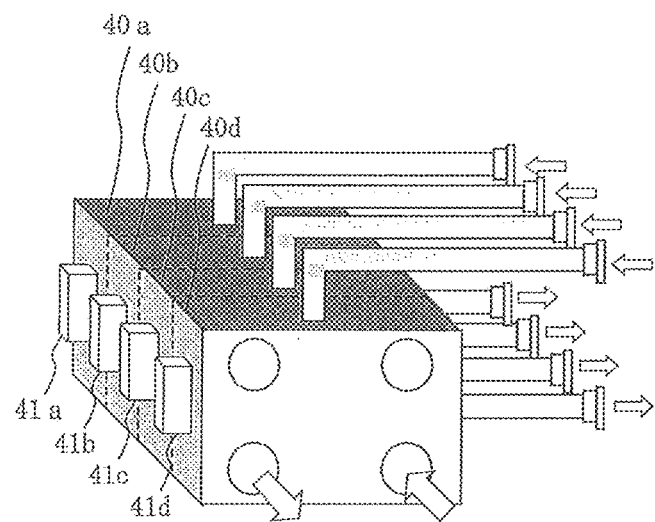
FIG. 7 illustrates the flow of a heat medium into and out of each of the heat-medium flow switching/control devices 40 when a heated heat medium is allowed to pass therethrough.

FIG. 7 illustrates the flow of a heat medium into and out of each of the heat-medium flow switching/control devices 40 when a heated heat medium is allowed to pass therethrough. In FIG. 7, solid arrows each indicate the direction of flow of a heated heat medium. The heat medium heated by exchanging heat with the heat-source-side refrigerant in the intermediate heat exchanger 25 and pressurized by the pump 31 flows into the heat-medium flow switching/control device 40. The heated heat medium passes through the main heating-heat-medium conveying pipes 43 in the heat-medium flow switching/control device 40.

Figure 8:
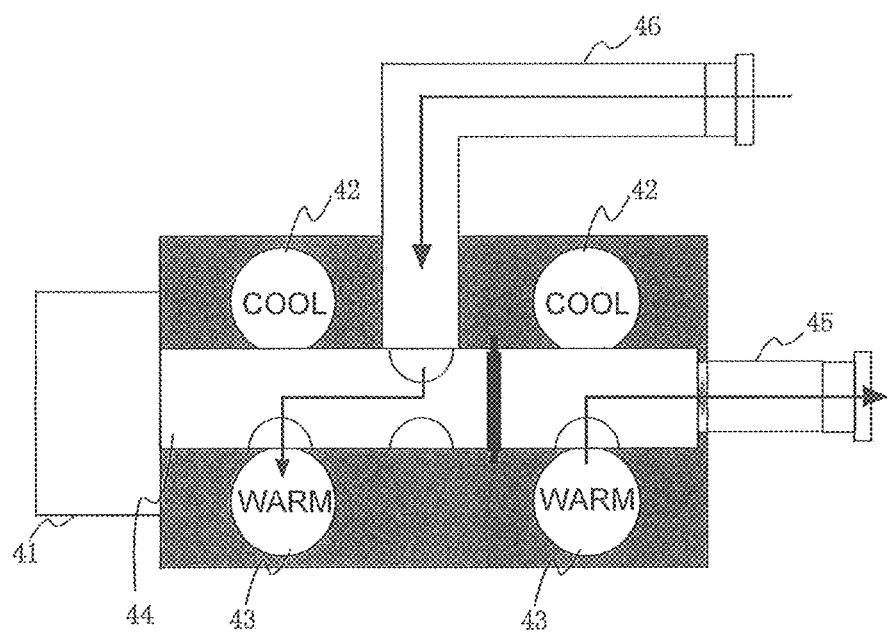
FIG. 8 illustrates a passage and flow of a heat medium inside one of the heat-medium flow switching/control devices 40 when a heated heat medium is allowed to pass therethrough.

FIG. 8 illustrates a passage and flow of a heat medium inside one of the heat-medium flow switching/control devices 40 when a heated heat medium is allowed to pass therethrough. For example, the drive unit 41 rotates the heat-medium flow switching valve 44, so that the through holes of the heat-medium flow switching valve 44 allow the connected-indoor-unit conveyance pipe 45 and the connected-indoor-unit return pipe 46 to communicate with the main heating-heat-medium conveying pipes 43. The heat medium flowing through one of the main heating-heat-medium conveying pipes 43 passes through the corresponding through hole of the heat-medium flow switching valve 44, flows through the connected-indoor-unit conveyance pipe 45, and is conveyed to the corresponding indoor unit 3.

After exchanging heat with the indoor space 7 at the use-side heat exchanger 35 in the indoor unit 3, the heat medium passes through the connected-indoor-unit return pipe 46 and flows into the heat-medium flow switching/control device 40 again. Then, the heat medium passes through the other through hole of the heat-medium flow switching valve 44, flows through the corresponding main heating-heat-medium conveying pipe 43, and flows into the intermediate heat exchanger 25.

The heat medium returned from the indoor unit 3 comes close to the heat medium that has passed through the intermediate heat exchanger 25 as in FIG. 2, flowed through one of the main heating-heat-medium conveying pipes 43, and flowed into the heat-medium flow switching valve 44 toward the indoor unit 3. Although the heat-medium flow switching valve 44 has the partition wall therein to prevent exchange of heat capacity between the heat media, any structure can be used as long as it can prevent exchange of heat capacity between the heat media.

For example, if it is possible to regulate the opening area of the heat-medium flow switching valve 44, the drive unit 41 regulates the opening area of the heat-medium flow switching valve 44, in accordance with an instruction from the controller 50, such that the difference between the temperature of the heat medium at the temperature sensor 55 of the relay unit 2 and the temperature of the heat medium at the use-side heat exchanger 35 is kept at a target value. When the drive unit 41 regulates the opening area, the flow rate of the heat medium flowing in the indoor unit 3 can be controlled to cover the air-conditioning load to be supplied to the indoor space 7. When there is no need to control the flow rate of the heat medium flowing in the indoor unit 3, it is not necessary to regulate the opening area.

[Operation of Heat-Medium Flow Switching/Control Device 40 at Stoppage]

Figure 9:
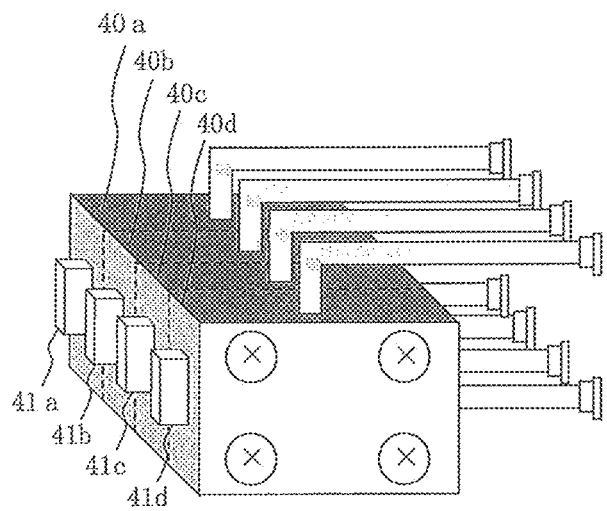
FIG. 9 illustrates the flow of a heat medium into and out of each of the heat-medium flow switching/control devices 40 when passage of a heat medium is stopped.

FIG. 9 illustrates the flow of a heat medium into and out of each of the heat-medium flow switching/control devices 40 when passage of a heat medium is stopped. In FIG. 9, solid arrows each indicate the direction of flow of a heat medium. For example, when the entire heat medium circuit B is not in operation, since the flow of a heat medium does not occur, no heat medium passes through the main cooling-heat-medium conveying pipes 42 and the main heating-heat-medium conveying pipes 43. However, if one or more indoor units 3 are in the cooling or the heating operation and there is a flow of a heat medium in the main cooling-heat-medium conveying pipes 42 and the main heating-heat-medium conveying pipes 43, the corresponding one or more heat-medium flow switching/control devices 40 each control the heat medium to prevent it from flowing into and out of the relay unit 2 that is not in operation.

Figure 10:
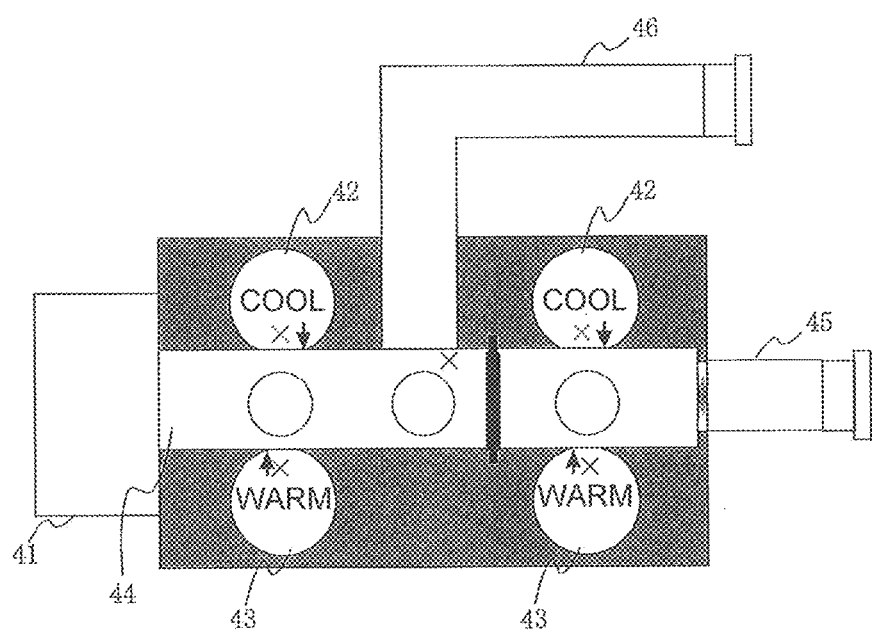
FIG. 10 illustrates a passage and flow of a heat medium inside one of the heat-medium flow switching/control devices 40 when passage of a heat medium is stopped.

FIG. 10 illustrates a passage and flow of a heat medium inside one of the heat-medium flow switching/control devices 40 when passage of a heat medium is stopped. For example, the drive unit 41 rotates the heat-medium flow switching valve 44, so that the through holes of the heat-medium flow switching valve 44 are positioned not to allow the connected-indoor-unit conveyance pipe 45 and the connected-indoor-unit return pipe 46 to communicate with the main cooling-heat-medium conveying pipes 42 and the main heating-heat-medium conveying pipes 43. Thus, since no passage is formed between the connected-indoor-unit conveyance pipe 45 and the connected-indoor-unit return pipe 46, and the main cooling-heat-medium conveying pipes 42 and the main heating-heat-medium conveying pipes 43, the flow of the heat medium into the corresponding indoor unit 3 can be blocked.

Although stoppage of the indoor units 3 has been described, the same applies, for example, to replacement and maintenance of components in the relay unit 2 on the side of the heat medium circuit B, and to replacement of the indoor units 3. A minimum amount of heat medium required can be discharged from the heat medium circuit B, and work efficiency can be improved.

As described above, since the relay unit 2 includes the heat-medium flow switching/control devices 40 corresponding to the respective indoor units 3, each indoor unit 3 can select and perform any of heating, cooling, and stop operations.

For efficient operation of the air-conditioning apparatus 100, it is necessary to efficiently supply, to each indoor unit 3 (use-side heat exchanger 35), an amount of heat required to cover the air-conditioning load. For each operation mode of the air-conditioning apparatus 100, a description will be given not only of the flow of the heat-source-side refrigerant and the heat medium, but also the control performed by the heat-medium flow switching/control devices 40.

[Operation Modes]

Each of the operation modes executed by the air-conditioning apparatus 100 will be described. The air-conditioning apparatus 100 is capable of cooling or heating in each indoor unit 3 in accordance with an instruction from the indoor unit 3. That is, the air-conditioning apparatus 100 is capable not only of performing the same operation in all the indoor units 3, but also of performing a cooling and heating mixed operation where either the cooling or the heating operation is performed depending on the indoor unit 3.

The operation modes executed by the air-conditioning apparatus 100 include a heating only operation mode in which all the indoor units 3 in operation execute heating, and a cooling only operation mode in which all the indoor units 3 being driven execute cooling. The air-conditioning apparatus 100 also executes a cooling and heating mixed operation mode, which includes a cooling main operation mode in which the air-conditioning load for cooling is larger than the air-conditioning load for heating, and a heating main operation mode in which the air-conditioning load for heating is larger than the air-conditioning load for cooling.

[Cooling and Heating Mixed Operation Mode]

Figure 11:
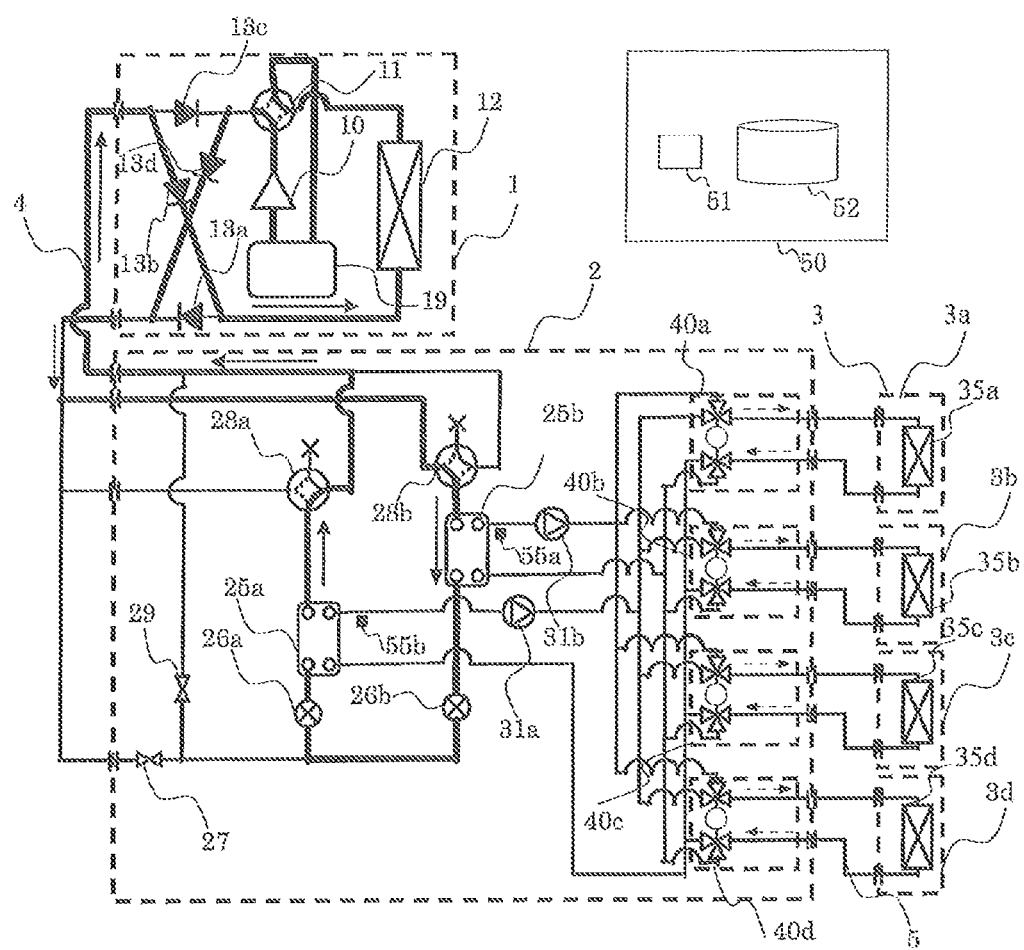
FIG. 11 illustrates the operation of devices and the flow of refrigerant in a mixed operation mode of the air-conditioning apparatus 100.

FIG. 11 illustrates the operation of devices and the flow of heat-source-side refrigerant in a mixed operation mode of the air-conditioning apparatus 100. FIG. 11 illustrates the heating main operation mode of the mixed operation in which air-conditioning load for heating is generated in some of the use-side heat exchangers 35 and air-conditioning load for cooling is generated in the remaining use-side heat exchangers 35. In FIG. 11, pipes represented by thick lines are those through each of which the heat-source-side refrigerant circulates. Also in FIG. 11, solid arrows each indicate the direction of flow of the heat-source-side refrigerant, and broken arrows each indicate the direction of flow of the heat medium.

In the heating main operation mode illustrated in FIG. 11, in the outdoor unit 1, the first refrigerant flow switching device 11 switches such that the heat-source-side refrigerant discharged from the compressor 10 flows into the relay unit 2 without passing through the heat-source-side heat exchanger 12. In the relay unit 2, the pump 31a and the pump 31b are driven to open the heat-medium flow switching/control devices 40a to 40d. A cooled heat medium circulates between the intermediate heat exchanger 25a and the use-side heat exchangers 35 that supply an amount of heat for the air-conditioning load for cooling. A heated heat medium circulates between the intermediate heat exchanger 25b and the use-side heat exchangers 35 in which the air-conditioning load for heating is generated. The second refrigerant flow switching device 28a is switched to the cooling side, whereas the second refrigerant flow switching device 28b is switched to the heating side. The expansion device 26a is fully opened, the opening and closing device 27 is closed, and the opening and closing device 29 is closed.

First, the flow of the heat-source-side refrigerant in the refrigerant circuit A will be described.

Low-temperature and low-pressure heat-source-side refrigerant is compressed by the compressor 10 into high-temperature and high-pressure gas refrigerant and discharged. The high-temperature and high-pressure gas refrigerant discharged from the compressor 10 passes through the first refrigerant flow switching device 11, the refrigerant pipe 4a, and the check valve 13d and then flows out of the outdoor unit 1. The high-temperature and high-pressure gas refrigerant flowing out of the outdoor unit 1 passes through the refrigerant pipe 4 and flows into the relay unit 2. The high-temperature and high-pressure gas refrigerant flowing into the relay unit 2 passes through the second refrigerant flow switching device 28b, and flows into the intermediate heat exchanger 25b acting as a condenser.

The gas refrigerant flowing into the intermediate heat exchanger 25b is condensed and liquefied into liquid refrigerant while transferring heat to the heat medium circulating through the heat medium circuit B. The liquid refrigerant flowing out of the intermediate heat exchanger 25b is expanded by the expansion device 26b into low-pressure two-phase refrigerant. The low-pressure two-phase refrigerant passes through the expansion device 26a and flows into the intermediate heat exchanger 25a acting as an evaporator. The low-pressure two-phase refrigerant flowing into the intermediate heat exchanger 25a receives heat from the heat medium circulating through the heat medium circuit B to evaporate, thereby cooling the heat medium. The low-pressure two-phase refrigerant flows out of the intermediate heat exchanger 25a, passes through the second refrigerant flow switching device 28a, flows out of the relay unit 2, passes through the refrigerant pipe 4, and flows into the outdoor unit 1 again.

The low-temperature and low-pressure two-phase refrigerant flowing into the outdoor unit 1 passes through the check valve 13b, and flows into the heat-source-side heat exchanger 12 acting as an evaporator. The refrigerant flowing into the heat-source-side heat exchanger 12 receives heat from the outside air at the heat-source-side heat exchanger 12 and turns into low-temperature and low-pressure gas refrigerant. The low-temperature and low-pressure gas refrigerant flowing out of the heat-source-side heat exchanger 12 passes through the first refrigerant flow switching device 11 and the accumulator 19, and is suctioned into the compressor 10 again.

The opening degree of the expansion device 26b is controlled such that the subcooling (degree of subcooling) of the heat-source-side refrigerant flowing out from the outlet side of the intermediate heat exchanger 25b becomes a target value. The expansion device 26b may be fully opened, and the subcooling may be controlled using the expansion device 26a.

Next, the flow of the heat medium in the heat medium circuit B will be described.

In the heating main operation mode, the heating energy of the heat-source-side refrigerant is transferred to the heat medium in the intermediate heat exchanger 25b, and the heated heat medium is caused to flow in the pipes 5 by the pump 31b. Also in the heating main operation mode, the cooling energy of the heat-source-side refrigerant is transferred to the heat medium in the intermediate heat exchanger 25a, and the cooled heat medium is caused to flow in the pipes 5 by the pump 31a. The cooled heat medium pressurized by and flowing out of the pump 31a passes through the heat-medium flow switching/control devices 40 and flows into the use-side heat exchangers 35 where air-conditioning load for cooling is generated, whereas the heat medium pressurized by and flowing out of the pump 31b passes through the heat-medium flow switching/control devices 40 and flows into the use-side heat exchangers 35 where air-conditioning load for heating is generated.

If the connected (corresponding) indoor unit 3 is in the heating operation, the heat-medium flow switching/control device 40 is switched to a direction in which the intermediate heat exchanger 25b and the pump 31b are connected, whereas if the connected indoor unit 3 is in the cooling operation, the heat-medium flow switching/control device 40 is switched to a direction in which the intermediate heat exchanger 25a and the pump 31a are connected. That is, the heat medium to be supplied to the indoor unit 3 can be switched between heating and cooling by the corresponding heat-medium flow switching/control device 40.

The use-side heat exchangers 35 each cool the indoor space 7 by allowing the heat medium to receive heat from the indoor air, or heat the indoor space 7 by allowing the heat medium to transfer heat to the indoor air. The heat medium flows into the use-side heat exchanger 35 at a flow rate that is controlled, by the action of the corresponding heat-medium flow switching/control device 40, to a level necessary to cover the air-conditioning load required indoors.

The heat medium slightly heated by being used for the cooling operation and passed through the use-side heat exchanger 35 passes through the heat-medium flow switching/control device 40, flows into the intermediate heat exchanger 25a, and is suctioned into the pump 31a again. The heat medium slightly cooled by being used for the heating operation and passed through the use-side heat exchanger 35 passes through the heat-medium flow switching/control device 40, flows into the intermediate heat exchanger 25b, and is suctioned into the pump 31b again. If the connected (corresponding) indoor unit 3 is in the heating operation, the heat-medium flow switching/control device 40 is switched to a direction in which the intermediate heat exchanger 25b and the pump 31b are connected, and performs [Operation of heat-medium flow switching/control device 40 during cooling] described above. If the connected indoor unit 3 is in the cooling operation, the heat-medium flow switching/control device 40 is switched to a direction in which the intermediate heat exchanger 25a and the pump 31a are connected, and performs [Operation of heat-medium flow switching/control device 40 during heating] described above.

During the operation described above, by the action of the heat-medium flow switching/control devices 40, the warm heat medium and the cool heat medium are introduced, without being mixed, into the use-side heat exchanger 35 under air-conditioning load for heating and the use-side heat exchanger 35 under air-conditioning load for cooling, respectively. Thus, the heat medium used for heating is caused to flow into the intermediate heat exchanger 25b that transfers heat from the heat-source-side refrigerant to the heat medium for the purpose of heating, while the heat medium used for cooling is caused to flow into the intermediate heat exchanger 25a that transfers heat from the heat medium to the heat-source-side refrigerant for the purpose of cooling. After the exchange of heat with the refrigerant again, the heat media are individually conveyed to the pump 31a and the pump 31b.

The air-conditioning load required in the indoor space 7 can be covered by controlling, on the heating side, the difference between the temperature detected by the temperature sensor 55b and the temperature of the heat medium flowing out of the use-side heat exchanger 35 to be kept at a target value, and controlling, on the cooling side, the difference between the temperature of the heat medium flowing out of the use-side heat exchanger 35 and the temperature detected by the temperature sensor 55a to be kept at a target value.

There is no need to circulate the heat medium through the use-side heat exchanger 35 under no air-conditioning load (including thermo-OFF state). Therefore, [Operation of heat-medium flow switching/control device 40 at stoppage] described above is performed to prevent the heat medium from flowing into the use-side heat exchanger 35. Then, if air-conditioning load is generated again, the corresponding heat-medium flow switching/control device 40 is opened to circulate the heat medium. The same applies to the other operation modes.

[Heating Only Operation Mode]

Figure 12:
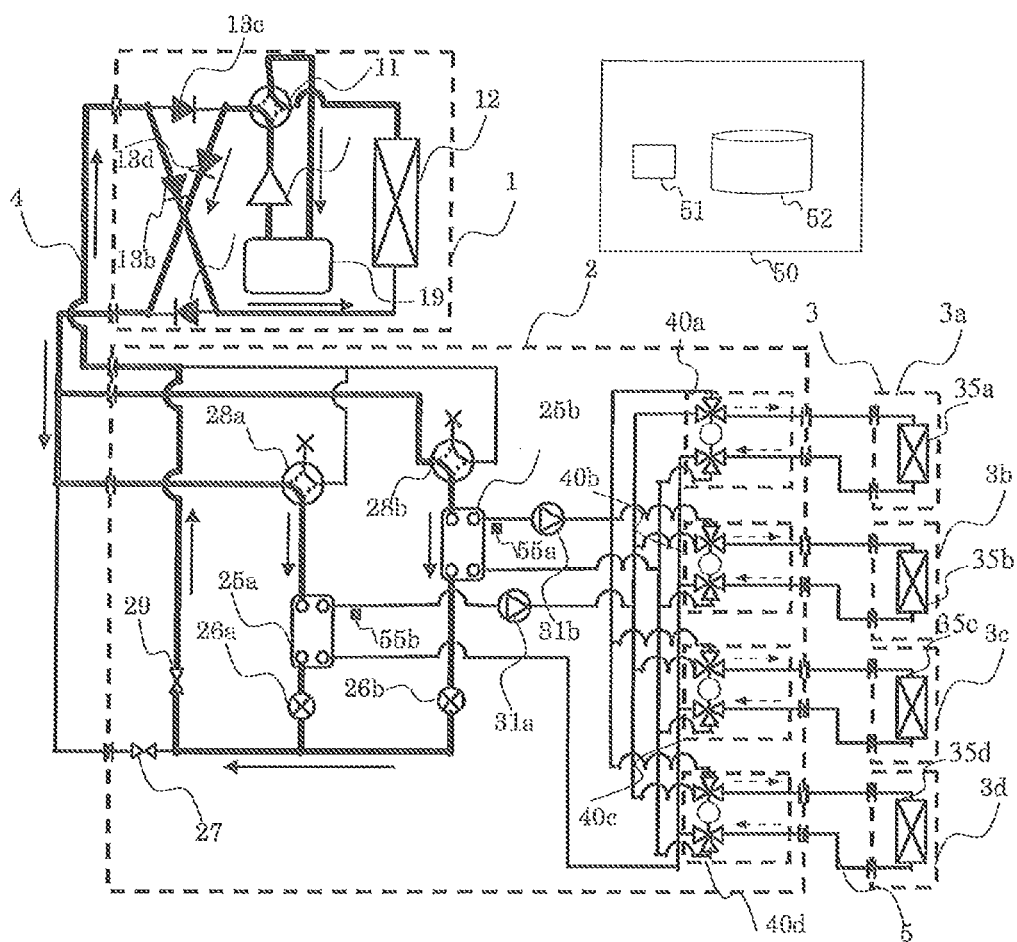
FIG. 12 illustrates the operation of devices and the flow of refrigerant in a heating only operation mode of the air-conditioning apparatus 100.

FIG. 12 illustrates the operation of devices and the flow of refrigerant in the heating only operation mode of the air-conditioning apparatus 100. With reference to FIG. 12, the heating only operation mode will be described using an example where air-conditioning load for heating is generated in all the use-side heat exchangers 35a to 35d. In FIG. 12, pipes represented by thick lines are those through each of which the heat-source-side refrigerant flows. Also in FIG. 12, solid arrows each indicate the direction of flow of the heat-source-side refrigerant, and broken arrows each indicate the direction of flow of the heat medium.

In the heating only operation mode illustrated in FIG. 12, in the outdoor unit 1, the first refrigerant flow switching device 11 switches such that the heat-source-side refrigerant discharged from the compressor 10 flows into the relay unit 2 without passing through the heat-source-side heat exchanger 12. In the relay unit 2, the pump 31a and the pump 31b are driven to open the heat-medium flow control devices, so that the heat medium circulates between each of the intermediate heat exchanger 25a and the intermediate heat exchanger 25b and the use-side heat exchangers 35a to 35d. The second refrigerant flow switching device 28a and the second refrigerant flow switching device 28b are switched to the heating side, the opening and closing device 27 is closed, and the opening and closing device 29 is opened.

First, the flow of the heat-source-side refrigerant in the refrigerant circuit A will be described.

Low-temperature and low-pressure heat-source-side refrigerant is compressed by the compressor 10 into high-temperature and high-pressure gas refrigerant and discharged. The high-temperature and high-pressure gas refrigerant discharged from the compressor 10 passes through the first refrigerant flow switching device 11, the refrigerant pipe 4a, and the check valve 13d and then flows out of the outdoor unit 1. The high-temperature and high-pressure gas refrigerant flowing out of the outdoor unit 1 passes through the refrigerant pipe 4 and flows into the relay unit 2. The high-temperature and high-pressure gas refrigerant flowing into the relay unit 2 is split into streams, which then pass through the respective second refrigerant flow switching device 28a and second refrigerant flow switching device 28b and flow into the respective intermediate heat exchanger 25a and intermediate heat exchanger 25b.

The streams of high-temperature and high-pressure gas refrigerant flowing into the intermediate heat exchanger 25a and the intermediate heat exchanger 25b are each condensed and liquefied into liquid refrigerant while transferring heat to the heat medium circulating through the heat medium circuit B. The streams of liquid refrigerant flowing out of the intermediate heat exchanger 25a and the intermediate heat exchanger 25b are expanded by the respective expansion device 26a and the expansion device 26b into streams of low-temperature and low-pressure two-phase refrigerant, which then join together. The resulting two-phase refrigerant passes through the opening and closing device 29, flows out of the relay unit 2, passes through the refrigerant pipe 4, and flows into the outdoor unit 1 again. The heat-source-side refrigerant flowing into the outdoor unit 1 passes through the refrigerant pipe 4b and the check valve 13b, and flows into the heat-source-side heat exchanger 12 acting as an evaporator.

The heat-source-side refrigerant flowing into the heat-source-side heat exchanger 12 receives heat from air in the outdoor space 6 (hereinafter referred to as outside air) at the heat-source-side heat exchanger 12 and turns into low-temperature and low-pressure gas refrigerant. The low-temperature and low-pressure gas refrigerant flowing out of the heat-source-side heat exchanger 12 passes through the first refrigerant flow switching device 11 and the accumulator 19, and is suctioned into the compressor 10 again.

The opening degree of each expansion device 26 is controlled such that the subcooling (degree of subcooling) obtained as a difference between a value obtained by converting the pressure of the heat-source-side refrigerant flowing between the corresponding intermediate heat exchanger 25 and the expansion device 26 into a saturation temperature and the temperature on the outlet side of the intermediate heat exchanger 25 is constant. If the temperature at the midpoint of the intermediate heat exchanger 25 can be measured, the temperature at the midpoint can be used in place of the saturation temperature obtained by the conversion. Since this eliminates the need for installation of a pressure sensor, the apparatus can be produced inexpensively.

Next, the flow of the heat medium in the heat medium circuit B will be described.

In the heating only operation mode, the heating energy of the heat-source-side refrigerant is transferred to the heat medium in both the intermediate heat exchanger 25a and the intermediate heat exchanger 25b, and the heated heat medium is caused to flow in the pipes 5 by the pump 31a and the pump 31b. The heat medium pressurized by and flowing out of the pump 31a and the pump 31b passes through the heat-medium flow switching/control devices 40 and flows into the use-side heat exchangers 35a to 35d, where the heat medium transfers heat to the indoor air for heating the indoor space 7.

Then, the heat medium flows out of the use-side heat exchangers 35a to 35d and flows into the heat-medium flow switching/control devices 40 again. The heat medium flows into the use-side heat exchangers 35a to 35d at a flow rate that is controlled, by the flow control action of the heat-medium flow switching/control devices 40, to a level necessary to cover the air-conditioning load required indoors. The heat medium flowing out of the heat-medium flow switching/control devices 40 flows into the intermediate heat exchanger 25a and the intermediate heat exchanger 25b, receives from the heat-source-side refrigerant an amount of heat supplied to the indoor space 7 through the indoor units 3, and is suctioned into the pump 31a and the pump 31b again.

The air-conditioning load required in the indoor space 7 can be covered by controlling, using each heat-medium flow switching/control device 40, the difference between the temperature detected either by the temperature sensor 55a or the temperature sensor 55b and the temperature of the heat medium flowing out of the corresponding use-side heat exchanger 35 to be kept at a target value. The temperature used as the outlet temperature of the intermediate heat exchanger 25 may be the temperature detected either by the temperature sensor 55a or the temperature sensor 55b, or may be their average temperature.

For example, in the heating only operation mode, as described above, both the intermediate heat exchanger 25a and the intermediate heat exchanger 25b heat the heat medium, which is then conveyed by the pump 31a and the pump 31b. Thus, the heated heat medium passes through the main cooling-heat-medium conveying pipes 42 and the main heating-heat-medium conveying pipes 43. Each heat-medium flow switching/control device 40 needs to convey, to the corresponding indoor unit 3, the heat medium having an amount of supplied heat that corresponds to air-conditioning load on the indoor unit 3.

At the same time, as described above, the heat-medium flow switching/control device 40 needs to select either the heat medium passed through the intermediate heat exchanger 25a or the heat medium passed through the intermediate heat exchanger 25b, and to convey the selected heat medium to the corresponding indoor unit 3.

Therefore, in Embodiment 1, in the heating only operation mode, the controller 50 performs, for the indoor units 3 in the heating operation, processing that involves ranking the capacities of the use-side heat exchangers 35 (i.e., heat exchange capacities or the amounts of supplied heat for air-conditioning load) in descending order. The capacity of each use-side heat exchanger 35 is stored in the storage device 52 as described above. For example, the capacity of the use-side heat exchanger 35a in the indoor unit 3a in the heating operation is represented by QjA, the capacity of the use-side heat exchanger 35b in the indoor unit 3b in the heating operation is represented by QjB, and the capacity of the use-side heat exchanger 35c in the indoor unit 3c in the heating operation is represented by QjC, where QjA>QjB>QjC. The ranking is as follows:

Qj_rank1=QjA

Qj_rank2=QjB

Qj_rank3=QjC

After the ranking, the controller 50 performs distribution such that the sum $\Sigma Qjc$ of capacities (amounts of supplied heat) for the indoor units 3 that allow the heat medium passing through the main cooling-heat-medium conveying pipes 42 to flow into and out of the indoor units 3 is as equal as possible to the sum $\Sigma Qjh$ of capacities (amounts of supplied heat) for the indoor units 3 that allow the heat medium passing through the main heating-heat-medium conveying pipes 43 to flow into and out of the indoor units 3. First, for the switching/control device 40a corresponding to the indoor unit 3a with Qj_rank1, the main heating-heat-medium conveying pipes 43 are caused to communicate with the connected-indoor-unit conveyance pipe 45 and the connected-indoor-unit return pipe 46 as described above. Also, the controller 50 performs processing that involves adding QjA to the sum ΣQjh (ΣQjh=QjA).

For processing of Qj_rank2 and the subsequent one, the 50 compares the sum ΣQjc with the sum ΣQjh. If determining that ΣQjc<ΣQjh, the controller 50 causes the main cooling-heat-medium conveying pipes 42 to communicate with the connected-indoor-unit conveyance pipe 45 and the connected-indoor-unit return pipe 46 for the corresponding heat-medium flow switching/control device 40. Also, the controller 50 performs processing that involves adding the corresponding capacity to the sum ΣQjc. If determining that ΣQjc≥ΣQjh, the controller 50 causes the main heating-heat-medium conveying pipes 43 to communicate with the connected-indoor-unit conveyance pipe 45 and the connected-indoor-unit return pipe 46 for the corresponding heat-medium flow switching/control device 40. Also, the controller 50 performs processing that involves adding the corresponding capacity to the sum ΣQjh.

For example, for processing of Qj_rank2, the controller 50 determines that ΣQjc (=0)<ΣQjh (=QjA). Thus, for the heat-medium flow switching/control device 40b, the controller 50 causes the main cooling-heat-medium conveying pipes 42 to communicate with the connected-indoor-unit conveyance pipe 45 and the connected-indoor-unit return pipe 46, and performs processing that involves adding QjB to the sum ΣQjc (ΣQjc=QjB). For processing of Qj_rank3, the controller 50 determines that ΣQjc (=QjB)<ΣQjh (=QjA). Thus, for the heat-medium flow switching/control device 40c, the controller 50 also causes the main cooling-heat-medium conveying pipes 42 to communicate with the connected-indoor-unit conveyance pipe 45 and the connected-indoor-unit return pipe 46, and performs processing that involves adding QjC to the sum ΣQjc (ΣQjc=QjB+QjC).

If determining that one of the indoor units 3 of the air-conditioning apparatus 100 has entered the thermo-ON mode (or has started the heating operation), the controller 50 immediately starts to execute the processing described above.

On the other hand, if determining that one of the indoor units 3 has entered the thermo-OFF mode (or heating thermo-OFF mode where only the fan is stopped), the controller 50 starts to measure the time with the timer 51 and then to execute the processing described above after the elapse of 10 minutes (first predetermined time period). If determining that another indoor unit 3 has entered the thermo-OFF mode (or heating thermo-OFF mode) before the elapse of the first predetermined time period, the controller 50 resets the time measurement with the timer 51 and starts the measurement again. Since it is possible that thermo-ON and thermo-OFF will be repeated, the first predetermined time period is set to 10 minutes as a buffer time period. However, the first predetermined time period is not limited to 10 minutes, and may be set to any value.

If determining that one of the indoor units 3 has stopped, the controller 50 starts to measure the time with the timer 51 and then to execute the processing described above after the elapse of 10 minutes (second predetermined time period). Even if another indoor unit 3 stops before the elapse of the second predetermined time period, the timer 51 continues to measure the time without being reset. Since it is possible that the operation will start and stop repeatedly, the second predetermined time period is set to 10 minutes. However, the second predetermined time period is not limited to 10 minutes, and may be set to any value.

The processing described above may be executed on the basis of the ratio between the amount of heat (ΣQjcc) in the heat medium passing through the main cooling-heat-medium conveying pipes 42 and the amount of heat (ΣQjhh) in the heat medium passing through the main heating-heat-medium conveying pipes 43. The value of ΣQjcc or ΣQjhh may change during operation depending on the air-conditioning load. For example, the controller 50 executes the processing if determining that 0.9>ΣQjcc/ΣQjhh or ΣQjcc/ΣQjhh>1.1. In the case of 0.9≤ΣQjcc/ΣQjhh≤1.1, the controller 50 maintains the current state without executing the processing. It is thus possible, for example, to prevent the direction and degree of opening of the heat-medium flow switching valve 44 in each heat-medium flow switching/control device 40 from being accidentally changed by frequent execution of the processing, and to improve the control performance of the heat-medium flow switching/control device 40.

To secure a passage to the indoor unit 3 in thermo-OFF mode, the opening degree is controlled in accordance with the temperature of the heat medium at the outlets of the intermediate heat exchanger 25a and the intermediate heat exchanger 25b. Each use-side heat exchanger 35 originally needs to be controlled in accordance with a difference in temperature between the inlet and outlet thereof. However, the temperature of the heat medium on the inlet side of the use-side heat exchanger 35 is substantially the same as the temperature detected by the temperature sensor 55b. Accordingly, using the temperature sensor 55b can reduce the number of temperature sensors, and make it possible to produce the apparatus inexpensively.

[Cooling Only Operation Mode]

Figure 13:
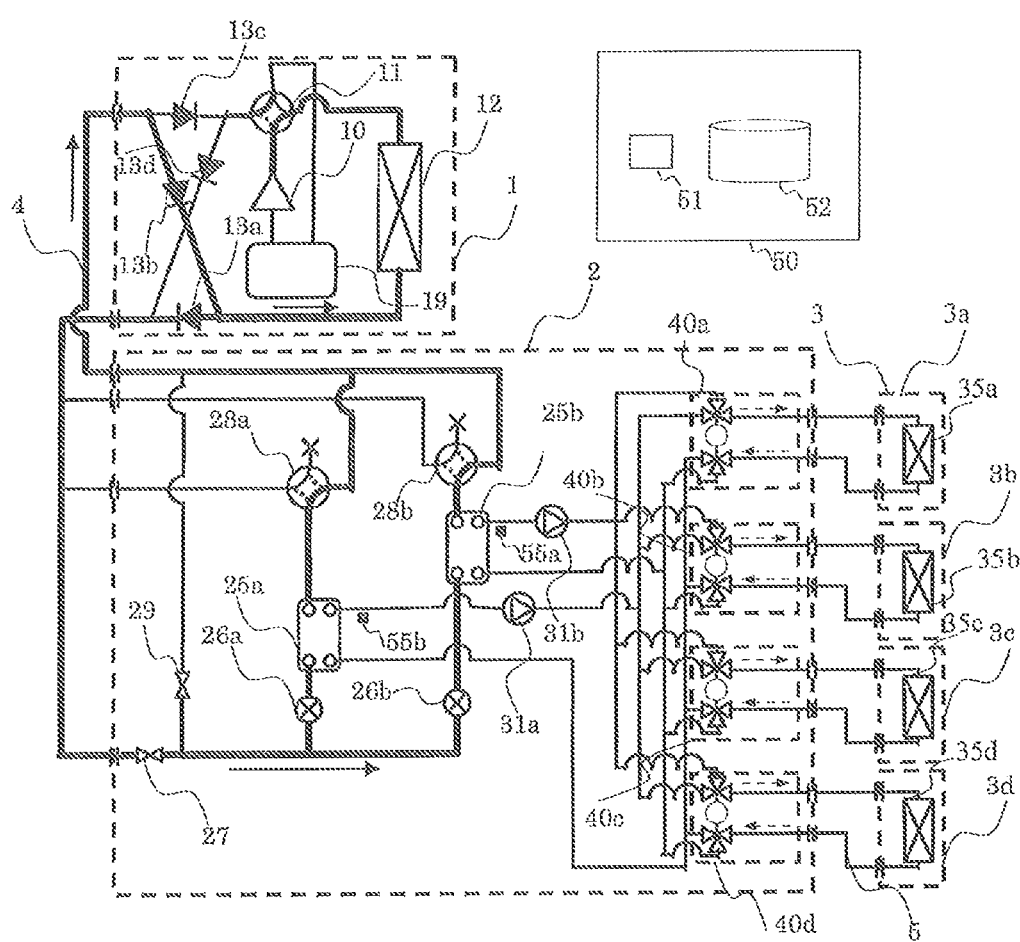
FIG. 13 illustrates the operation of devices and the flow of refrigerant in a cooling only operation mode of the air-conditioning apparatus 100.

FIG. 13 illustrates the operation of devices and the flow of refrigerant in the cooling only operation mode of the air-conditioning apparatus 100. With reference to FIG. 13, the cooling only operation mode will be described using an example where air-conditioning load for cooling is generated in all the use-side heat exchangers 35a to 35d. In FIG. 13, solid arrows each indicate the direction of flow of the heat-source-side refrigerant, and broken arrows each indicate the direction of flow of the heat medium.

In the cooling only operation mode illustrated in FIG. 13, in the outdoor unit 1, the first refrigerant flow switching device 11 switches to allow the heat-source-side refrigerant discharged from the compressor 10 to flow into the heat-source-side heat exchanger 12.

In the relay unit 2, the pump 31a and the pump 31b are driven to open the heat-medium flow switching/control devices 40, so that the heat medium circulates between each of the intermediate heat exchanger 25a and the intermediate heat exchanger 25b and the use-side heat exchangers 35a to 35d. The heat-medium flow switching/control devices 40 are switched to the cooling side, the opening and closing device 27 is opened, and the opening and closing device 29 is closed.

First, the flow of the heat-source-side refrigerant in the refrigerant circuit A will be described.

Low-temperature and low-pressure heat-source-side refrigerant is compressed by the compressor 10 into high-temperature and high-pressure gas refrigerant and discharged. The high-temperature and high-pressure gas refrigerant discharged from the compressor 10 passes through the first refrigerant flow switching device 11 and the heat-source-side heat exchanger 12, exchanges heat with the outside air, turns into high-temperature and high-pressure liquid or two-phase refrigerant, passes through the check valve 13a and the refrigerant pipe 4a, and then flows out of the outdoor unit 1. The high-temperature and high-pressure liquid or two-phase refrigerant flowing out of the outdoor unit 1 passes through the refrigerant pipe 4 and flows into the relay unit 2. After flowing into the relay unit 2, the high-temperature and high-pressure liquid or two-phase refrigerant passes through the opening and closing device 27 and is split into streams, which are expanded by the expansion device 26a and the expansion device 26b into streams of low-temperature and low-pressure two-phase refrigerant. The streams of two-phase refrigerant are evaporated and gasified into low-temperature gas refrigerant while receiving heat from the heat medium circulating in the heat medium circuit B. The gas refrigerant flowing out of the intermediate heat exchanger 25a and the intermediate heat exchanger 25b passes through the second refrigerant flow switching device 28a and the second refrigerant flow switching device 28b, flows out of the relay unit 2, passes through the refrigerant pipe 4b and the check valve 13c, further passes through the first refrigerant flow switching device 11 and the accumulator 19, and is suctioned into the compressor 10 again.

The opening degree of each expansion device 26 is controlled such that the superheat (degree of superheat) obtained as a difference between a value obtained by converting the pressure of the heat-source-side refrigerant flowing between the corresponding intermediate heat exchanger 25 and the expansion device 26 into a saturation temperature and the temperature on the outlet side of the intermediate heat exchanger 25 is constant. If the temperature at the midpoint of the intermediate heat exchanger 25 can be measured, the temperature at the midpoint can be used in place of the saturation temperature obtained by the conversion. Since this eliminates the need for installation of a pressure sensor, the apparatus can be produced inexpensively.

Next, the flow of the heat medium in the heat medium circuit B will be described.

In the cooling only operation mode, the heating energy of the heat medium is transferred to the heat-source-side refrigerant in both the intermediate heat exchanger 25a and the intermediate heat exchanger 25b, and the cooled heat medium is pressurized by the pump 31a and the pump 31b. The heat medium flowing out of the pump 31a and the pump 31b passes through the heat-medium flow switching/control devices 40 and flows into the use-side heat exchangers 35a to 35d, where the heat medium receives heat from the indoor air for cooling the indoor space 7.

Then, the heat medium flows out of the use-side heat exchangers 35a to 35d and flows into the heat-medium flow switching/control devices 40a to 40d. The heat medium flows into the use-side heat exchangers 35a to 35d at a flow rate that is controlled, by the action of the heat-medium flow switching/control devices 40, to a level necessary to cover the air-conditioning load required indoors. The heat medium flowing out of the heat-medium flow switching/control devices 40a to 40d flows into the intermediate heat exchanger 25a and the intermediate heat exchanger 25b, transfers to the heat-source-side refrigerant an amount of heat received from the indoor space 7 through the indoor units 3, and is suctioned into the pump 31a and the pump 31b again.

In the pipes 5 of the use-side heat exchangers 35, the heat medium flows in the direction from the connected-indoor-unit conveyance pipe 45 to the connected-indoor-unit return pipe 46. The air-conditioning load required in the indoor space 7 can be covered by controlling the difference between the temperature detected either by the temperature sensor 55a or the temperature sensor 55b and the temperature of the heat medium flowing out of the corresponding use-side heat exchanger 35 to be kept at a target value. The temperature used as the outlet temperature of the intermediate heat exchanger 25 may be the temperature detected either by the temperature sensor 55a or the temperature sensor 55b, or may be their average temperature.

For example, in the cooling only operation mode, as described above, both the intermediate heat exchanger 25a and the intermediate heat exchanger 25b cool the heat medium, which is then conveyed by the pump 31a and the pump 31b. Thus, the cooled heat medium passes through the main cooling-heat-medium conveying pipes 42 and the main heating-heat-medium conveying pipes 43. Each heat-medium flow switching/control device 40 needs to convey, to the corresponding indoor unit 3, the heat medium having an amount of supplied heat that corresponds to air-conditioning load on the indoor unit 3.

At the same time, as described above, the heat-medium flow switching/control device 40 needs to select either the heat medium passed through the intermediate heat exchanger 25a or the heat medium passed through the intermediate heat exchanger 25b, and to convey the selected heat medium to the corresponding indoor unit 3.

Therefore, in Embodiment 1, as in the heating only operation mode described above, in the cooling only operation mode, the controller 50 performs, for the indoor units 3 in the cooling operation, processing that involves ranking the capacities of the use-side heat exchangers 35 (i.e., heat exchange capacities or the amounts of supplied heat for air-conditioning load for cooling) in descending order. For example, the capacity of the use-side heat exchanger 35a in the indoor unit 3a in the cooling operation is represented by QjA, the capacity of the use-side heat exchanger 35b in the indoor unit 3b in the cooling operation is represented by QjB, and the capacity of the use-side heat exchanger 35c in the indoor unit 3c in the cooling operation is represented by QjC, where QjA>QjB>QjC. The ranking is as follows:

Qj_rank1=QjA

Qj_rank2=QjB

Qj_rank3=QjC

After the ranking, the controller 50 performs distribution such that the sum ΣQjc of capacities (amounts of supplied heat) for the indoor units 3 that allow the heat medium passing through the main cooling-heat-medium conveying pipes 42 to flow into and out of the indoor units 3 is as equal as possible to the sum ΣQjh of capacities (amounts of supplied heat) for the indoor units 3 that allow the heat medium passing through the main heating-heat-medium conveying pipes 43 to flow into and out of the indoor units 3. First, for the switching/control device 40a corresponding to the indoor unit 3a with Qj_rank1, the main cooling-heat-medium conveying pipes 42 are caused to communicate with the connected-indoor-unit conveyance pipe 45 and the connected-indoor-unit return pipe 46 as described above. Also, the controller 50 performs processing that involves adding QjA to the sum ΣQjc (ΣQjc=QjA).

For processing of Qj_rank2 and the subsequent one, the 50 compares the sum ΣQjc with the sum ΣQjh. If determining that ΣQjh<ΣQjc, the controller 50 causes the main heating-heat-medium conveying pipes 43 to communicate with the connected-indoor-unit conveyance pipe 45 and the connected-indoor-unit return pipe 46 for the corresponding heat-medium flow switching/control device 40. Also, the controller 50 performs processing that involves adding the corresponding capacity to the sum ΣQjh. If determining that ΣQjh≥ΣQjc, the controller 50 causes the main cooling-heat-medium conveying pipes 42 to communicate with the connected-indoor-unit conveyance pipe 45 and the connected-indoor-unit return pipe 46 for the corresponding heat-medium flow switching/control device 40. Also, the controller 50 performs processing that involves adding the corresponding capacity to the sum ΣQjc.

For example, for processing of Qj_rank2, the controller 50 determines that ΣQjh (=0)<ΣQjc (=QjA). Thus, for the heat-medium flow switching/control device 40b, the controller 50 causes the main heating-heat-medium conveying pipes 43 to communicate with the connected-indoor-unit conveyance pipe 45 and the connected-indoor-unit return pipe 46, and performs processing that involves adding QjB to the sum ΣQjh (ΣQjh=QjB). For processing of Qj_rank3, the controller 50 determines that ΣQjh (=QjB)<ΣQjc (=QjA). Thus, for the heat-medium flow switching/control device 40c, the controller 50 also causes the main heating-heat-medium conveying pipes 43 to communicate with the connected-indoor-unit conveyance pipe 45 and the connected-indoor-unit return pipe 46, and performs processing that involves adding QjC to the sum ΣQjh (ΣQjh=QjB+QjC).

As in the heating only operation mode, if determining that one of the indoor units 3 of the air-conditioning apparatus 100 has entered the thermo-ON mode (or has started the cooling operation), the controller 50 immediately starts to execute the processing described above.

On the other hand, if determining that one of the indoor units 3 has entered the thermo-OFF mode (or cooling thermo-OFF mode), the controller 50 starts to measure the time with the timer 51 and then to execute the processing described above after the elapse of 10 minutes (first predetermined time period). If determining that another indoor unit 3 has entered the thermo-OFF mode (or cooling thermo-OFF mode) before the elapse of the first predetermined time period, the controller 50 resets the time measurement with the timer 51 and starts the measurement again. The first predetermined time period is not limited to 10 minutes, and may be set to any value.

If determining that one of the indoor units 3 has stopped, the controller 50 starts to measure the time with the timer 51 and then to execute the processing described above after the elapse of 10 minutes (second predetermined time period). Even if another indoor unit 3 stops before the elapse of the second predetermined time period, the timer 51 continues to measure the time without being reset. The second predetermined time period is not limited to 10 minutes, and may be set to any value.

The processing described above may be executed on the basis of the ratio between ΣQjcc and ΣQjhh. For example, as in the heating only operation mode, the controller 50 executes the processing if determining that 0.9>ΣQjhh/ΣQjcc or ΣQjhh/ΣQjcc>1.1. It is thus possible to improve the control performance of the heat-medium flow switching/control device 40.

To secure a passage to the indoor unit 3 in thermo-OFF mode, the opening degree is controlled in accordance with the temperature of the heat medium at the outlets of the intermediate heat exchanger 25a and the intermediate heat exchanger 25b. Each use-side heat exchanger 35 originally needs to be controlled in accordance with a difference in temperature between the inlet and outlet thereof. However, the temperature of the heat medium on the inlet side of the use-side heat exchanger 35 is substantially the same as the temperature detected by the temperature sensor 55b. Accordingly, using the temperature sensor 55b can reduce the number of temperature sensors, and make it possible to produce the apparatus inexpensively.

As described above, the air-conditioning apparatus 100 according to Embodiment 1 does not circulate the heat-source-side refrigerant in or near the indoor units 3 and thus provides improved safety. Also, by providing the heat-medium flow switching/control devices 40 to reduce the number of drive units 41, the air-conditioning apparatus 100 can not only reduce operating power used for the cooling or the heating operation, but also achieve lower cost by reducing the number of drive units 41. Additionally, by closing the heat-medium flow switching/control devices 40 to prevent conveyance of the heat medium to the indoor units 3 that are connected to the relay unit 2 and are in stop mode, it is possible not only to reduce the conveying power of the pumps 31 serving as heat-medium conveying devices, but also to reduce the amount of heat medium discharged during replacement of components or maintenance, thereby improving the convenience in installation.

The directions and degrees of openings of the heat-medium flow switching/control devices 40 in the cooling only operation mode and the heating only operation mode are distributed in accordance with the capacity of each of the corresponding indoor units 3. Thus, the heat medium can be heated by the intermediate heat exchangers 25 with as equal amount of heat as possible, and then conveyed by the pumps 31. Control performance can thus be improved.

Embodiment 2

Although Embodiment 1 describes the air-conditioning apparatus 100 including the accumulator 19, the present invention is applicable to an air-conditioning apparatus not including the accumulator 19. Typically, the heat-source-side heat exchanger 12 and the use-side heat exchangers 35 are each provided with an air-sending device, and condensation or evaporation is often accelerated by blowing air. However, the configuration is not limited to this. For example, the use-side heat exchangers 35 may each be a panel heater that uses radiation. The heat-source-side heat exchanger 12 may be of a water-cooled type that transfers heat using water or antifreeze. The heat-source-side heat exchanger 12 and the use-side heat exchangers 35 may be of any type as long as they are capable of transferring or receiving heat.

Although the number of the use-side heat exchangers 35 is four in Embodiment 1 described above, the number of the use-side heat exchangers 35 is not specifically limited to this. Although two intermediate heat exchangers 25a and 25b are installed in Embodiment 1, the number is not limited to this and any number of intermediate heat exchangers 25 can be installed, as long as they are configured to be capable of cooling and/or heating the heat medium. Also, the number of the pump 31a and the pump 31b each is not limited to one, and a plurality of small-capacity pumps may be arranged and connected in parallel.

Although the second refrigerant flow switching devices 28 are each described as a four-way valve in Embodiment 1, the second refrigerant flow switching devices 28 are not limited to this, and may be configured to form similar flow of the heat-source-side refrigerant, for example, by using a plurality of two-way passage switching valves or three-way passage switching valves.

In Embodiment 1 described above, the distribution among the indoor units 3 (use-side heat exchangers 35) is made such that each intermediate heat exchanger 25 supplies the same amount of heat to the heat medium. However, for example, if the amount of heat that can be supplied to the heat medium varies depending on the intermediate heat exchanger 25, the distribution can be made in accordance with the ratio of the amount of heat that can be supplied.

In Embodiment 1 described above, the intermediate heat exchangers 25 are each configured to heat or cool the heat medium through the use of heat exchange with the refrigerant that circulates in the refrigerant circuit A. However, the configuration is not limited to this. The intermediate heat exchangers 25 may be replaced by devices capable of heating or cooling the heat medium.

The invention claimed is:

1. An air-conditioning apparatus comprising:
a refrigerant circuit formed by connecting, with pipes, a compressor configured to compress heat-source-side refrigerant, a refrigerant flow switching device including a valve body and configured to switch a circulation path of the heat-source-side refrigerant, a heat-source-side heat exchanger configured to cause the heat-source-side refrigerant to exchange heat, an expansion device configured to regulate a pressure of the heat-source-side refrigerant, and a plurality of intermediate heat exchangers each configured to exchange heat between the heat-source-side refrigerant and a heat medium different from the heat-source-side refrigerant;
a heat medium circuit formed by connecting, with pipes, a plurality of pumps configured to pressurize and circulate the heat medium subjected to heat exchange in the plurality of intermediate heat exchangers, a plurality of use-side heat exchangers each configured to exchange heat between the heat medium and air in an air-conditioned space, and a flow switching device configured to switch which of the heat medium subjected to heat exchange in the plurality of intermediate heat exchangers is to be allowed to flow into and out of each of the use-side heat exchangers; and
a controller configured to perform processing for controlling switching performed by the flow switching device, in accordance with a capacity of each of the use-side heat exchangers,
wherein the air-conditioning apparatus causes the plurality of use-side heat exchangers to operate
a heating only operation mode where all of the plurality of use-side heat exchangers in operation perform heating,
a cooling only operation mode where all of the plurality of use-side heat exchangers in operation perform cooling, and
a cooling and heating mixed operation mode where some of the plurality of use-side heat exchangers in operation perform heating and other of the plurality of use-side heat exchangers performs cooling, and
the controller performs the processing in the cooling only operation mode and the heating only operation mode.

2. The air-conditioning apparatus of claim 1, wherein the controller controls the switching by the flow switching device to equalize amounts of heat supplied by the intermediate heat exchangers to the heat medium, in accordance with the capacity of each of the use-side heat exchangers.

3. The air-conditioning apparatus of claim 2, wherein the controller ranks the capacities of the corresponding use-side heat exchangers in descending order, distributes values of the capacities between or among the intermediate heat exchangers, adds up the distributed values for each of the intermediate heat exchangers, and equalizes the resulting sums of the capacities between or among the intermediate heat exchangers.

4. The air-conditioning apparatus of claim 1, wherein when one of the use-side heat exchangers starts to operate, the controller performs the processing when a first predetermined time period elapses after a thermo-OFF mode has been entered or a second predetermined time period elapses after the one of the use-side heat exchangers has stopped operating.

5. The air-conditioning apparatus of claim 1, wherein the flow switching device is capable of switching the heat medium and controlling a flow rate of the heat medium allowed to flow into and out of the use-side heat exchanger, and
the switching of the heat medium and the control of the flow rate are performed by driving a drive unit.

6. A method for controlling an air-conditioning apparatus including
a heat medium circuit formed by connecting, with pipes, a plurality of intermediate heat exchangers each configured to heat or cool a heat medium, a plurality of pumps each configured to pressurize and circulate the heat medium, a plurality of use-side heat exchangers each configured to exchange heat between the heat medium and air in an air-conditioned space, and a flow switching device configured to switch which of the heat medium subjected to heat exchange in the plurality of intermediate heat exchangers is to be allowed to flow into and out of each of the use-side heat exchangers, and
a controller configured to perform processing for controlling switching performed by the flow switching device, in accordance with a plurality of capacities including a capacity of each of the use-side heat exchangers,
the method for controlling the air-conditioning apparatus comprising:
ranking the capacities of each of the use-side heat exchangers in descending order by the controller;
distributing values of the capacities between or among the intermediate heat exchangers, adding up the distributed values for each of the intermediate heat exchangers, and equalizing the resulting sums of the capacities between or among the intermediate heat exchangers by the controller; and
controlling the switching performed by the flow switching device in accordance with the distribution by the controller.

7. The method of claim 6, further comprising, when one of the use-side heat exchangers starts to operate, performing, by the controller, the processing when a first predetermined time period elapses after a thermo-OFF mode has been entered or a second predetermined time period elapses after the one of the use-side heat exchangers has stopped operating.

8. The method of claim 6, wherein the flow switching device is capable of switching the heat medium and controlling a flow rate of the heat medium allowed to flow into and out of the use-side heat exchanger, and the switching of the heat medium and the control of the flow rate are performed by driving a drive unit.

* * * * *